Dec. 21, 1943.   P. TANIS ET AL   2,337,529
UNIVERSAL TUFTING MACHINE
Filed Dec. 4, 1941   14 Sheets-Sheet 6
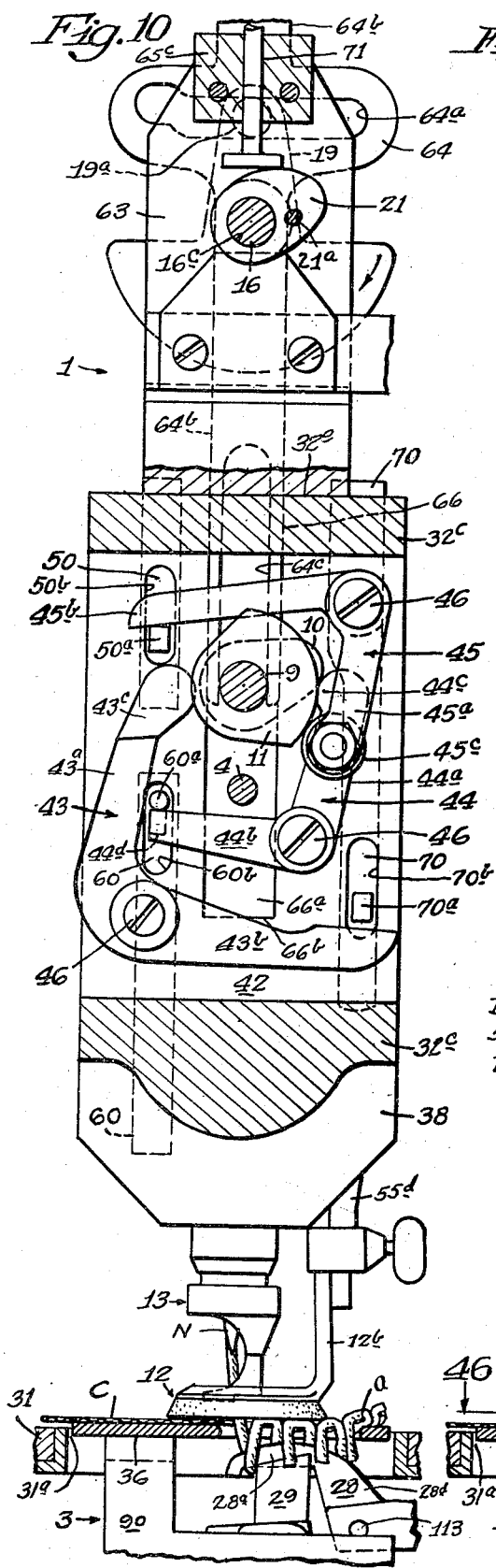
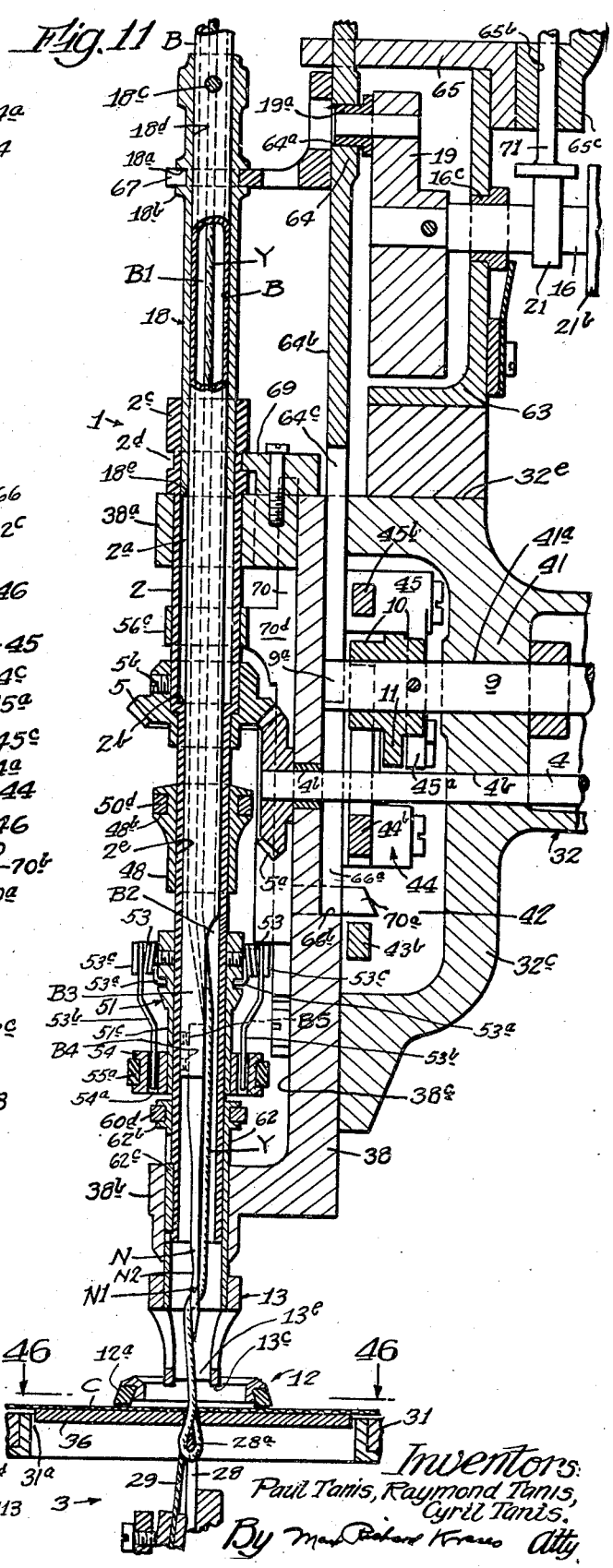

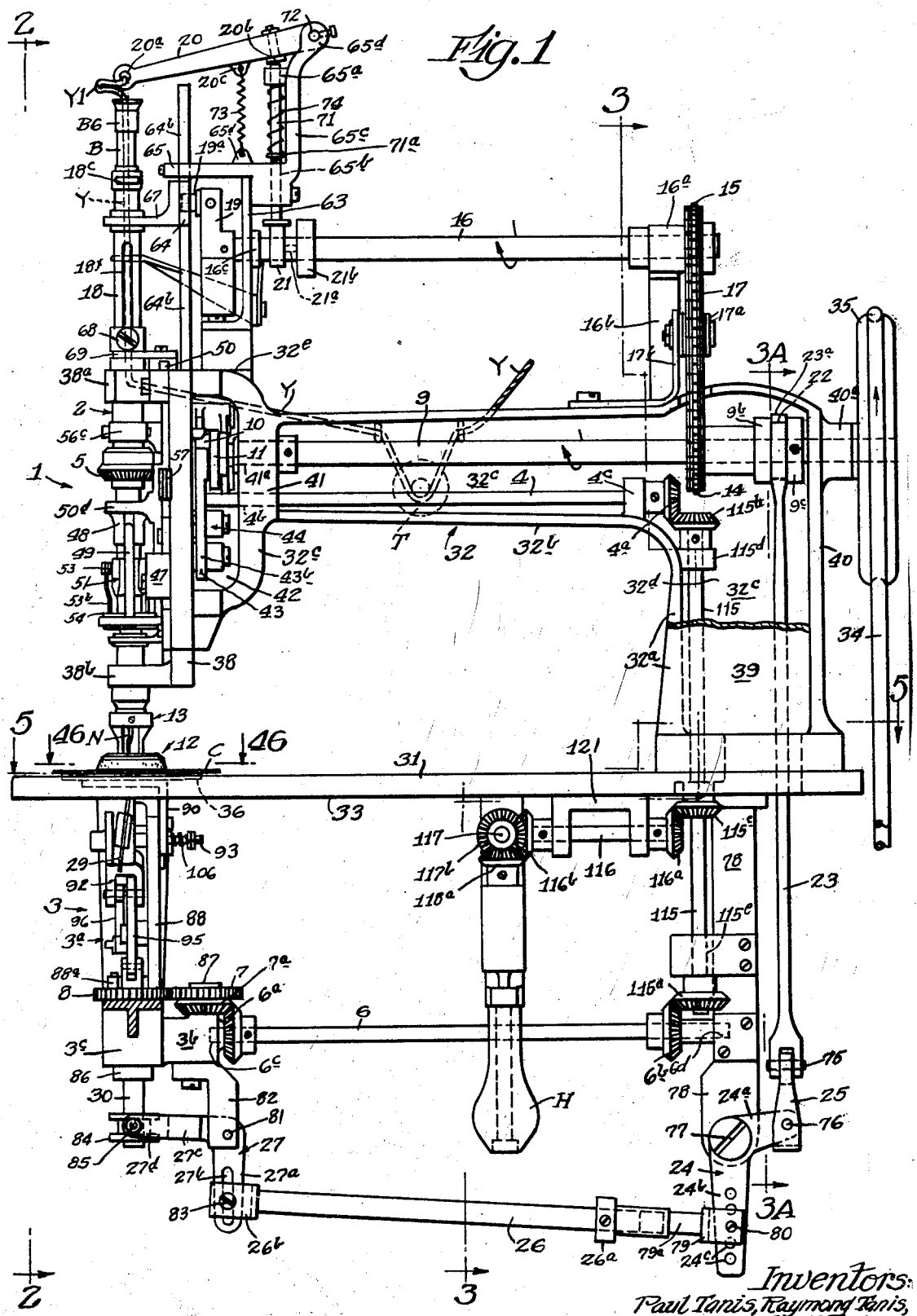

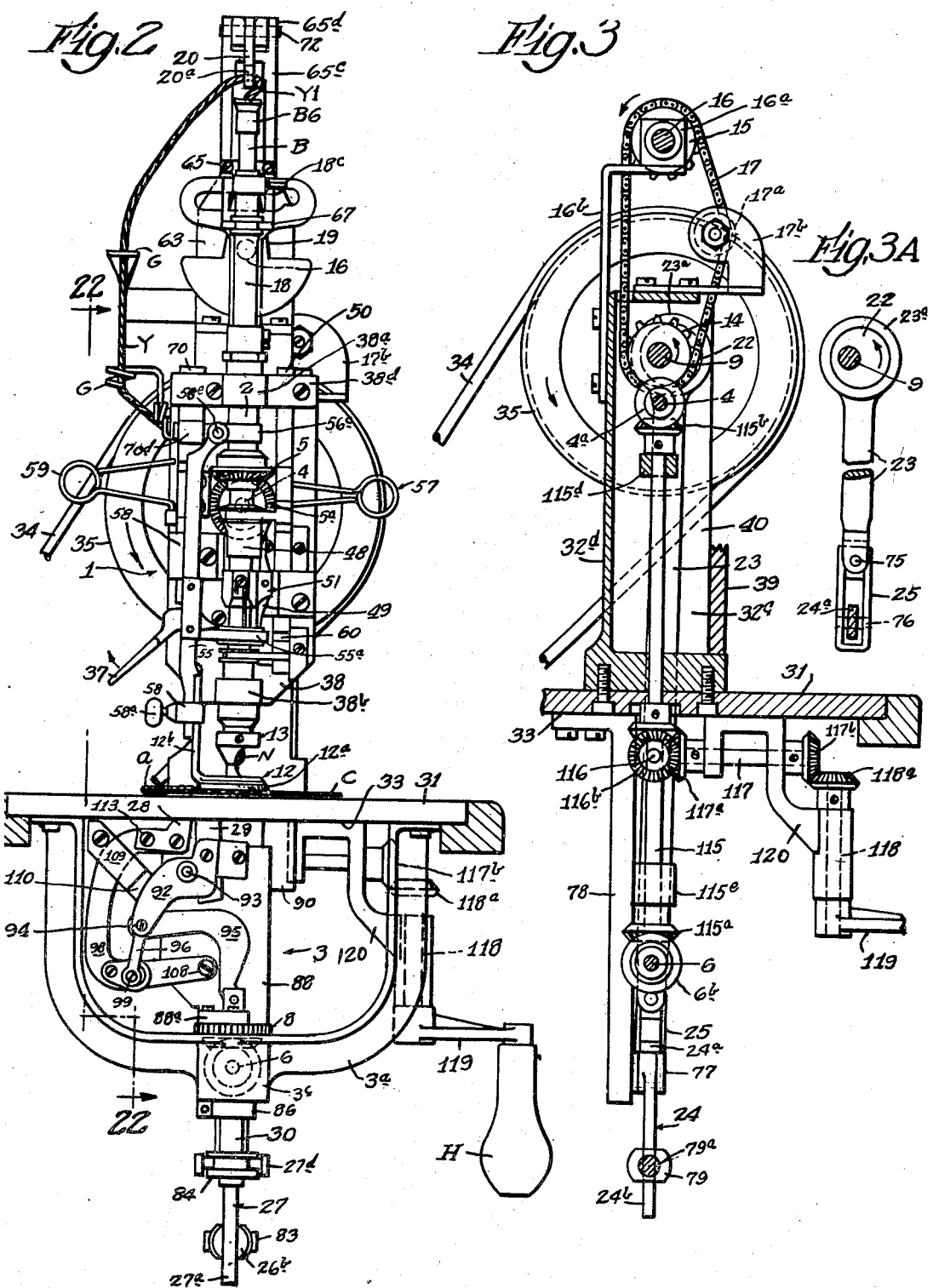

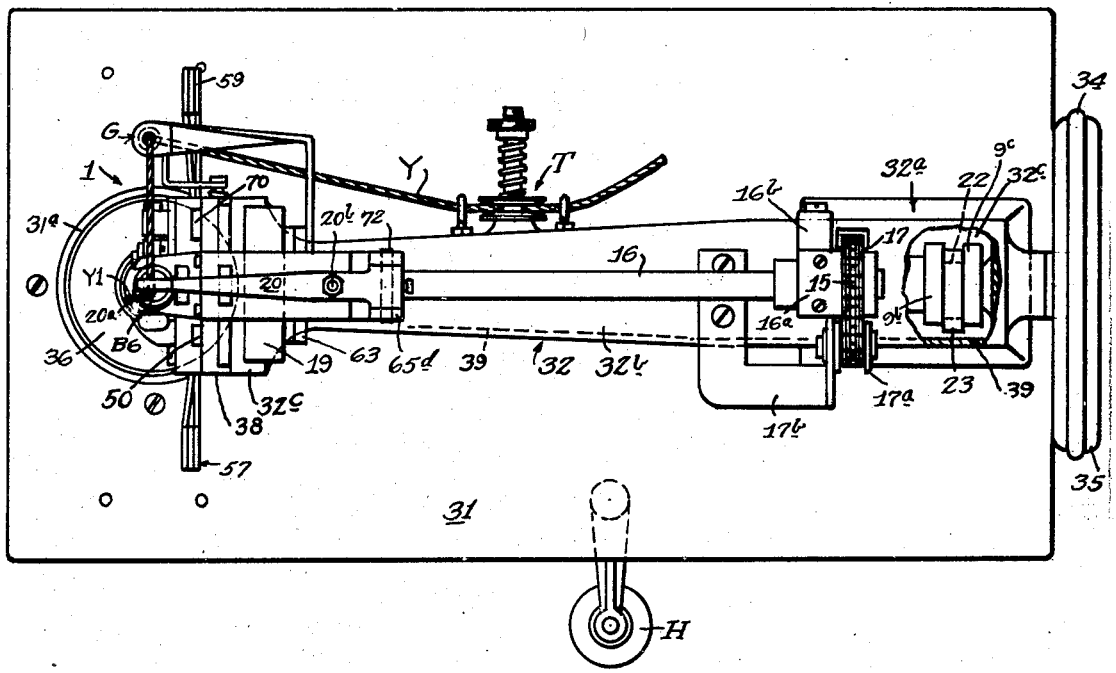

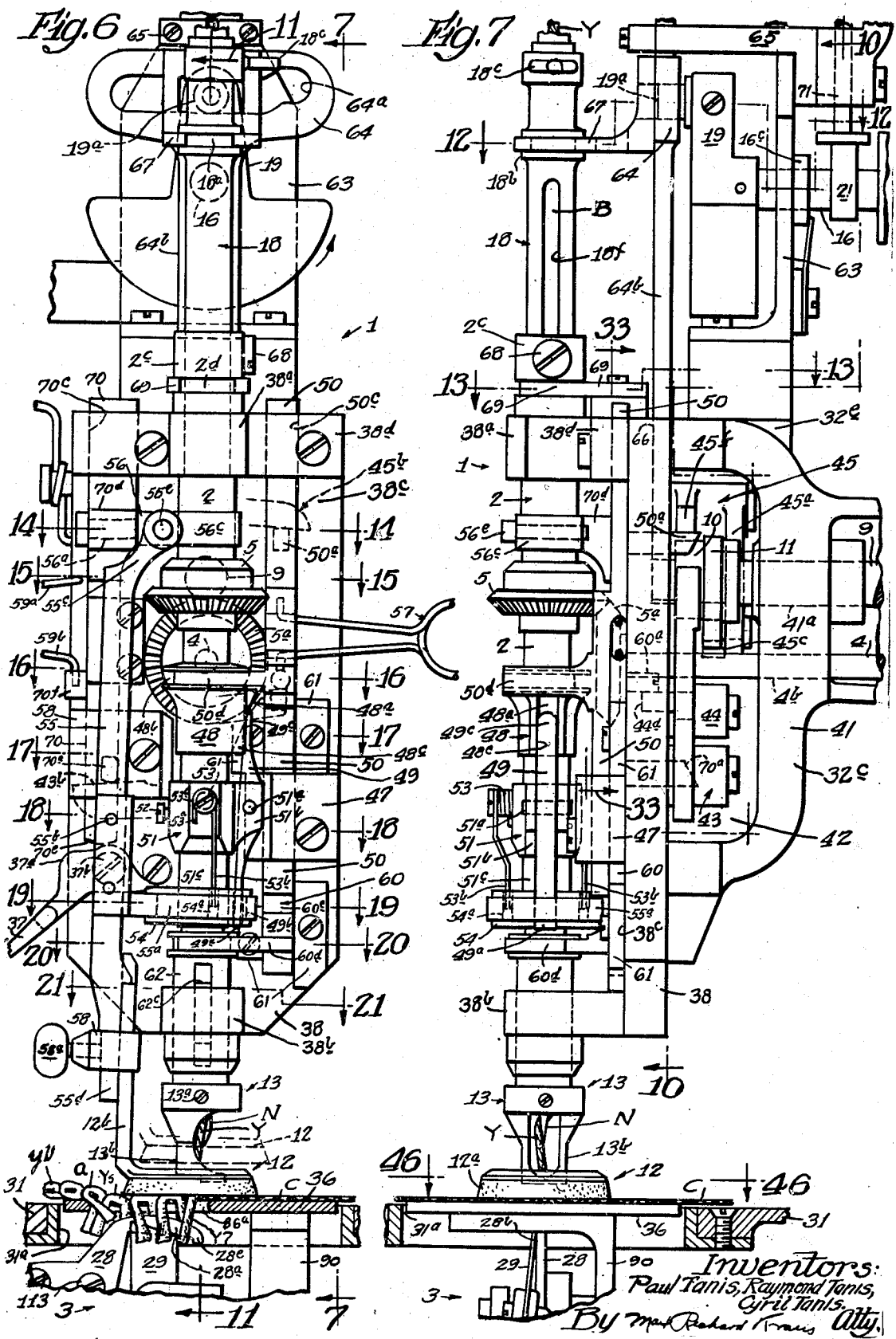

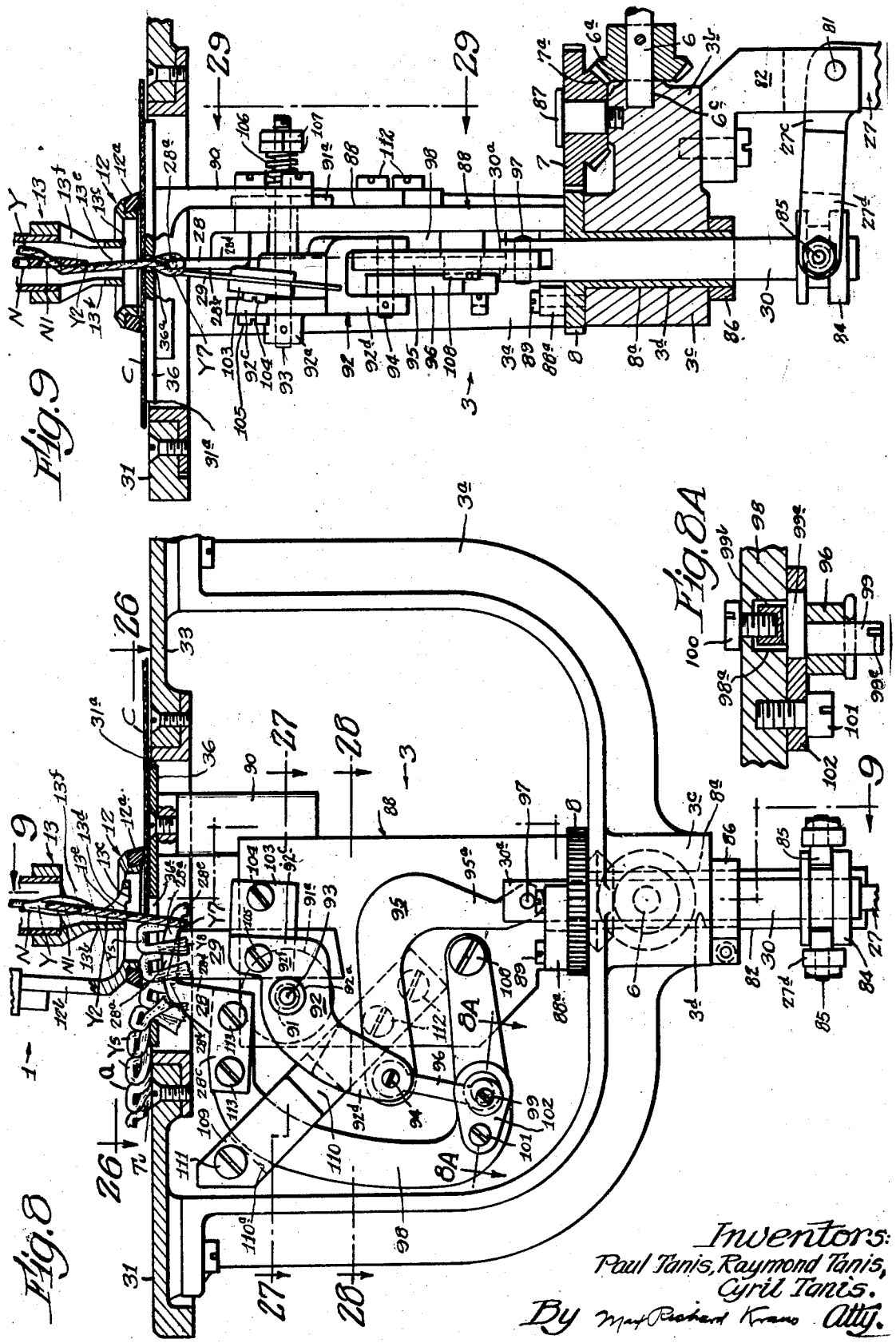

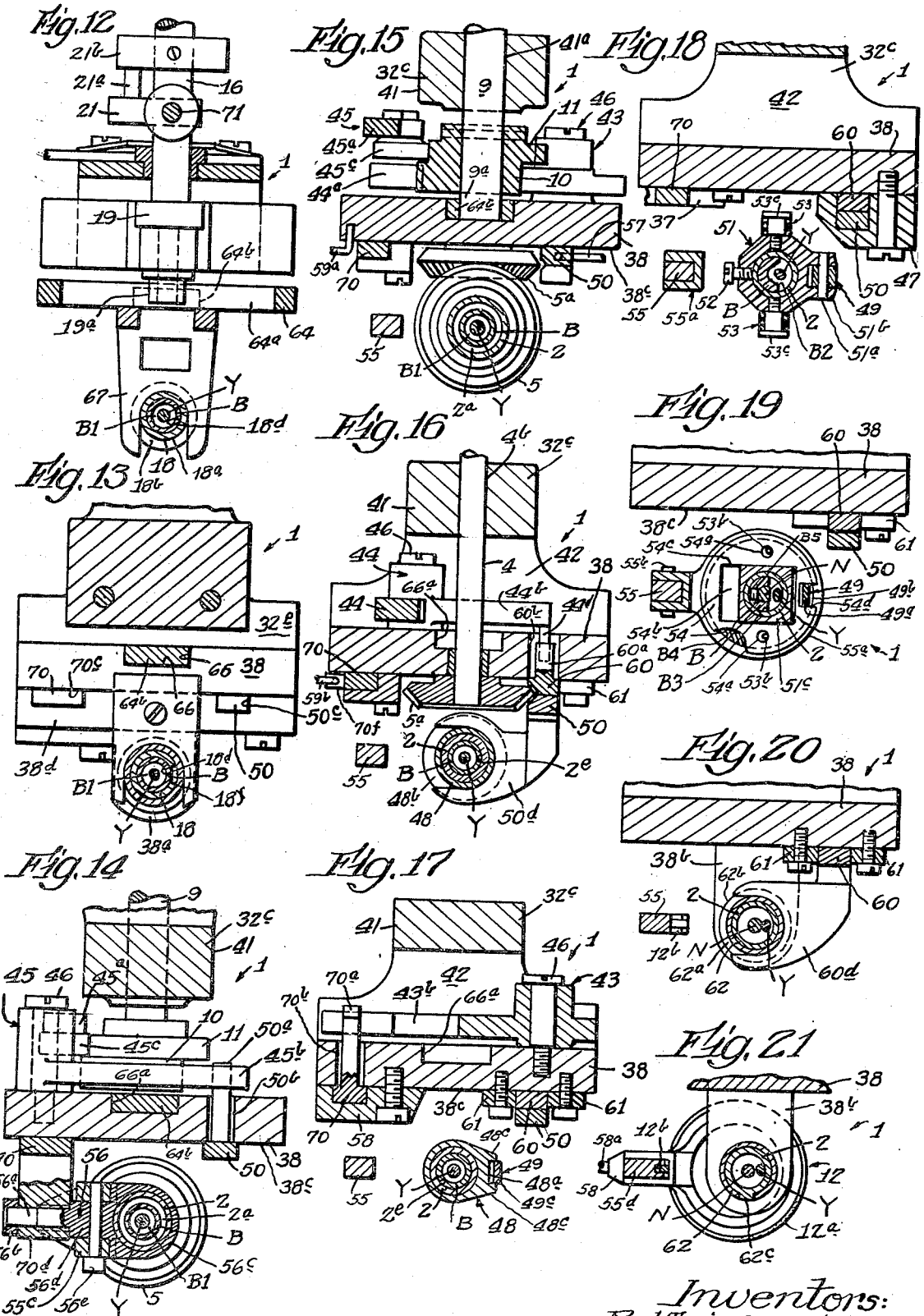

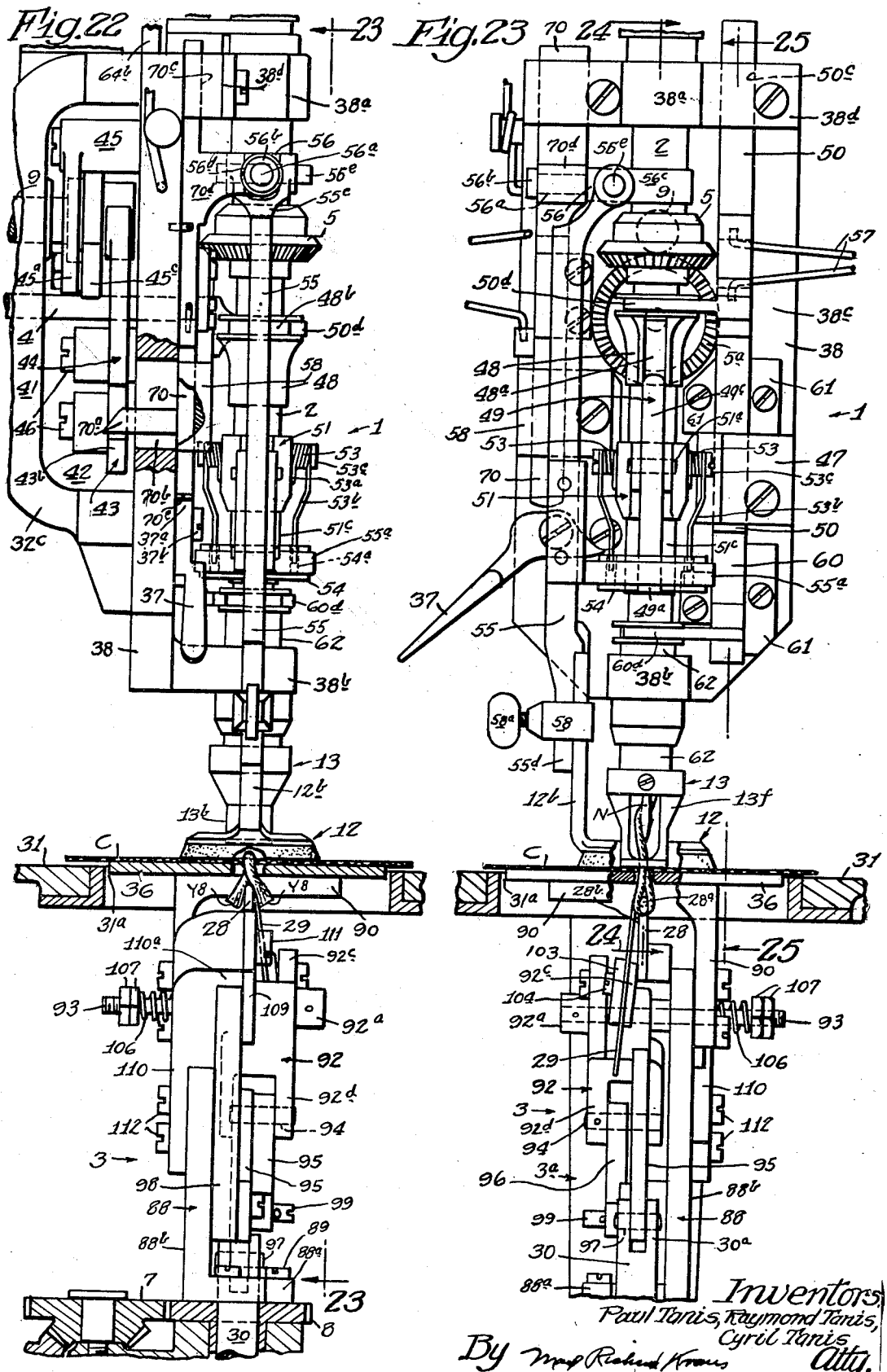

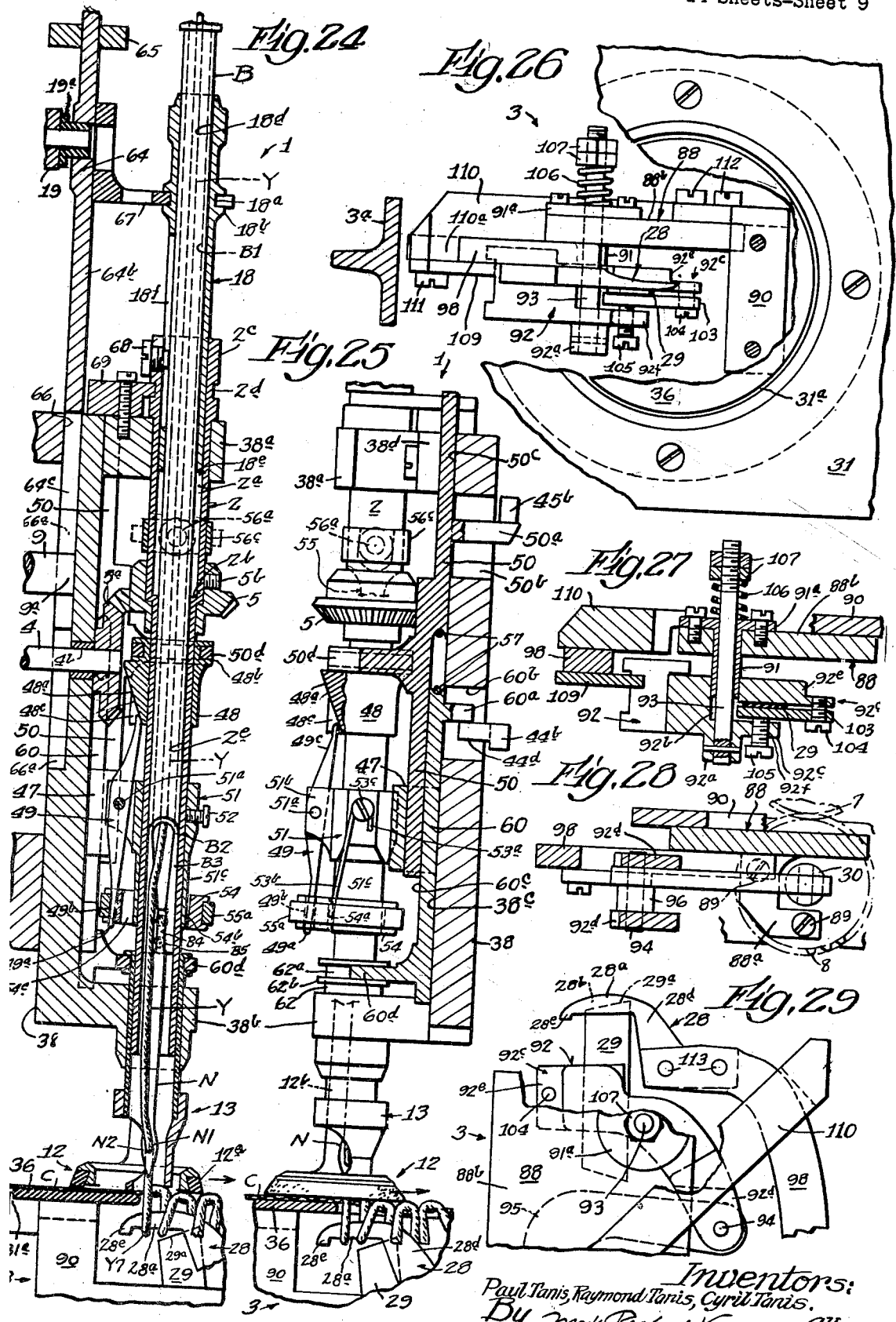

Dec. 21, 1943.  P. TANIS ET AL  2,337,529
UNIVERSAL TUFTING MACHINE
Filed Dec. 4, 1941  14 Sheets-Sheet 10
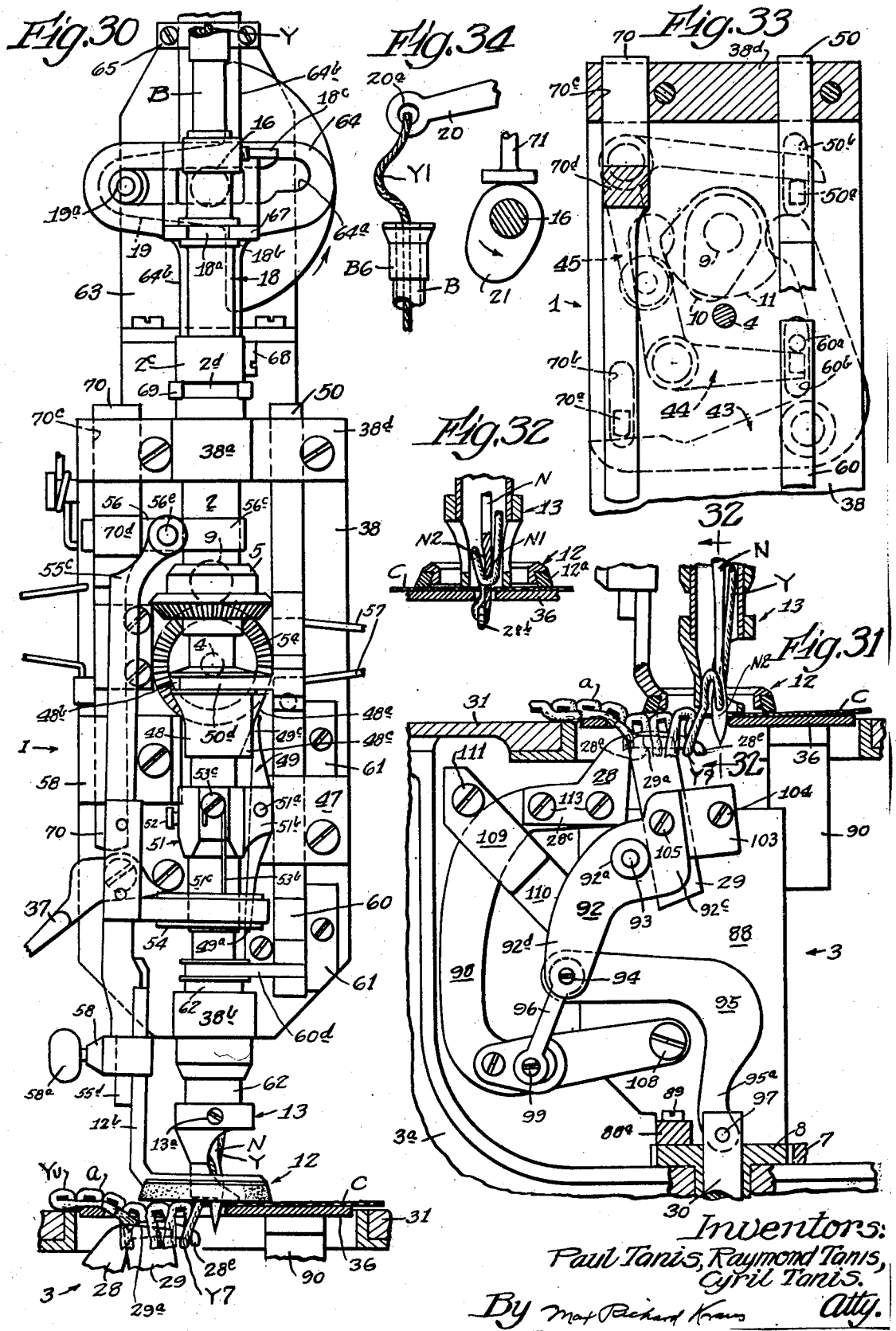
Inventors:
Paul Tanis, Raymond Tanis,
Cyril Tanis.
By Max Richard Kraus  Atty.

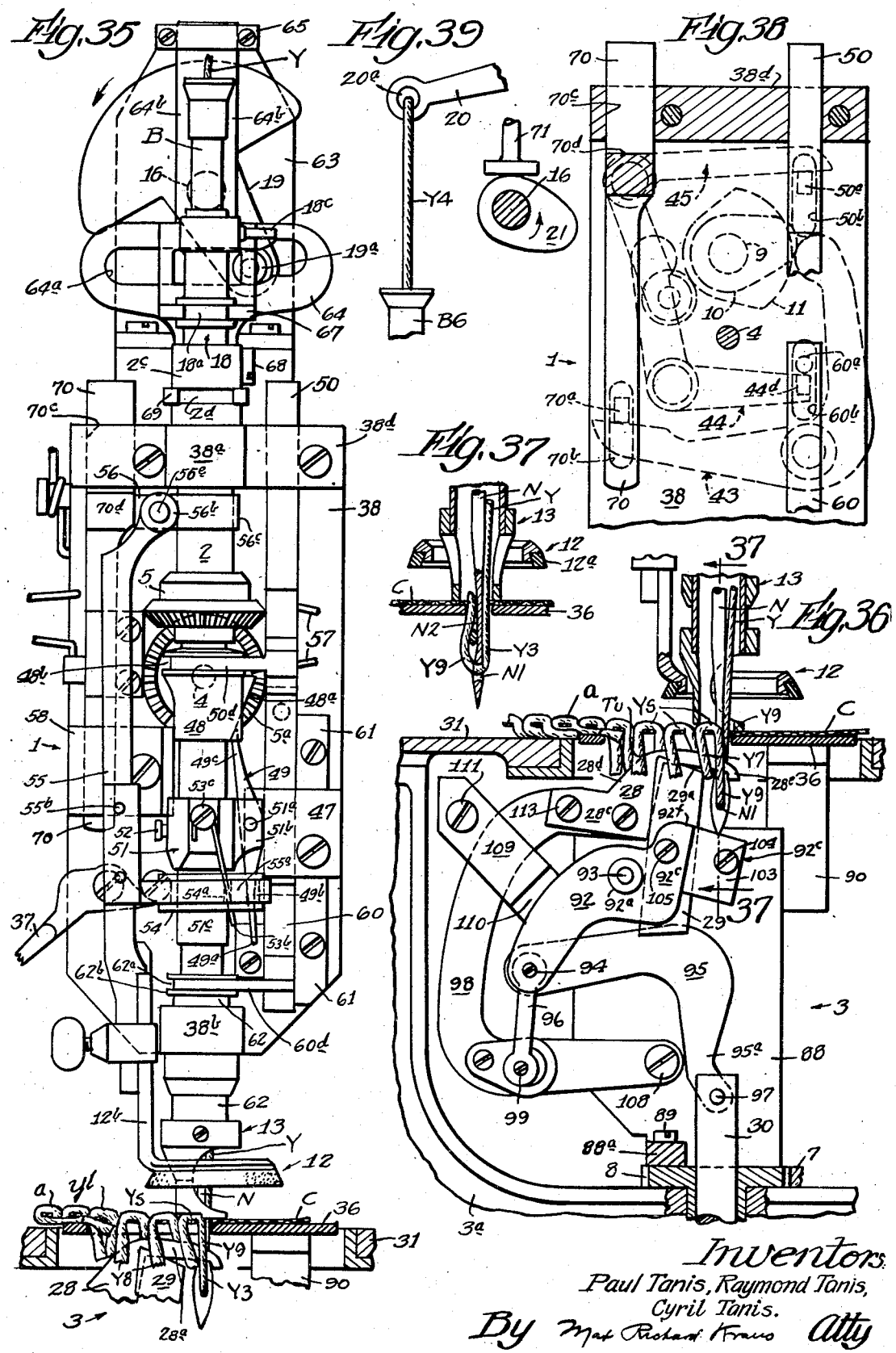

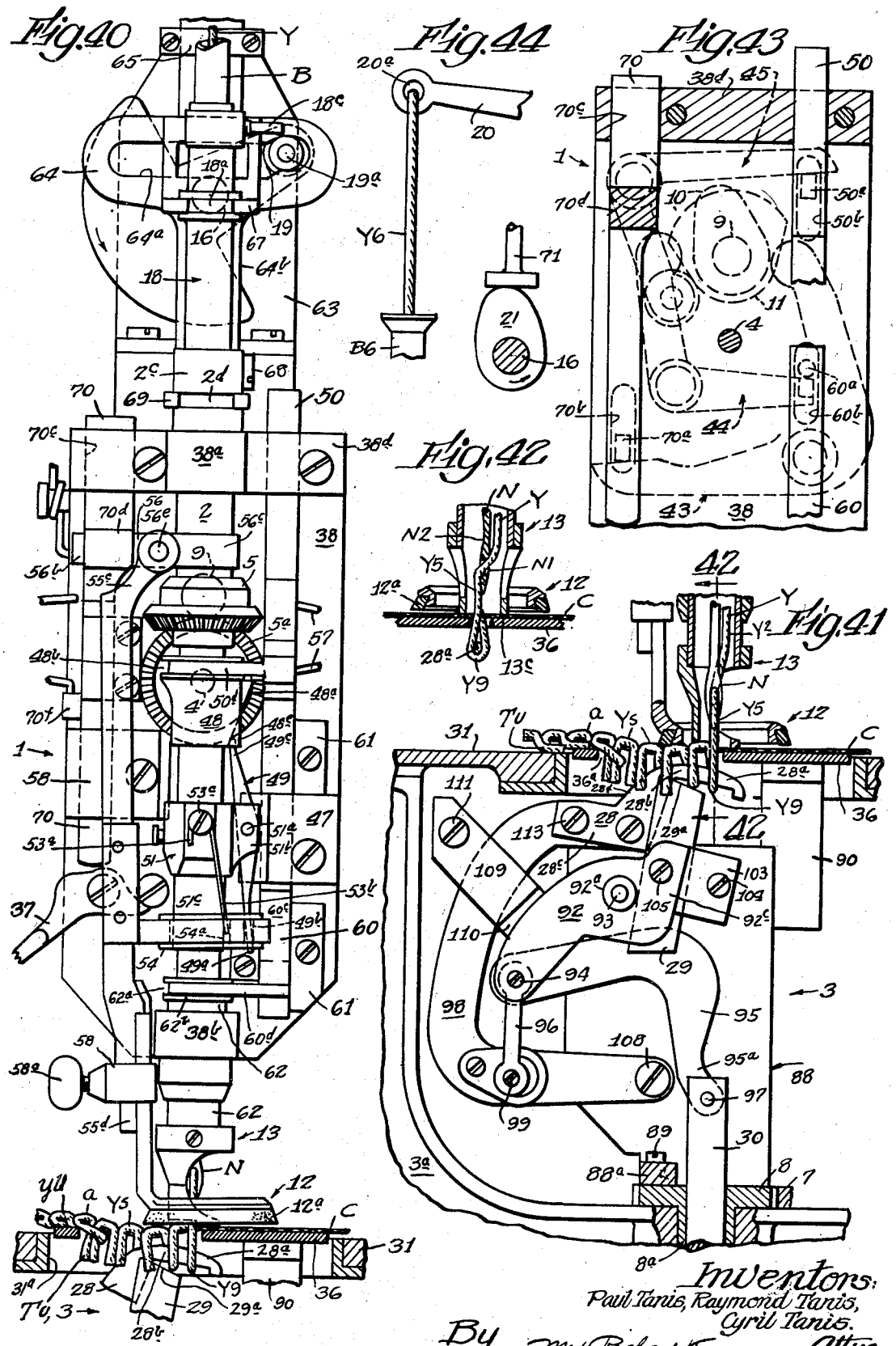

Dec. 21, 1943. P. TANIS ET AL 2,337,529
UNIVERSAL TUFTING MACHINE
Filed Dec. 4, 1941 14 Sheets-Sheet 13

Inventors:
Paul Tanis,
Raymond Tanis, Cyril Tanis,
By Atty.

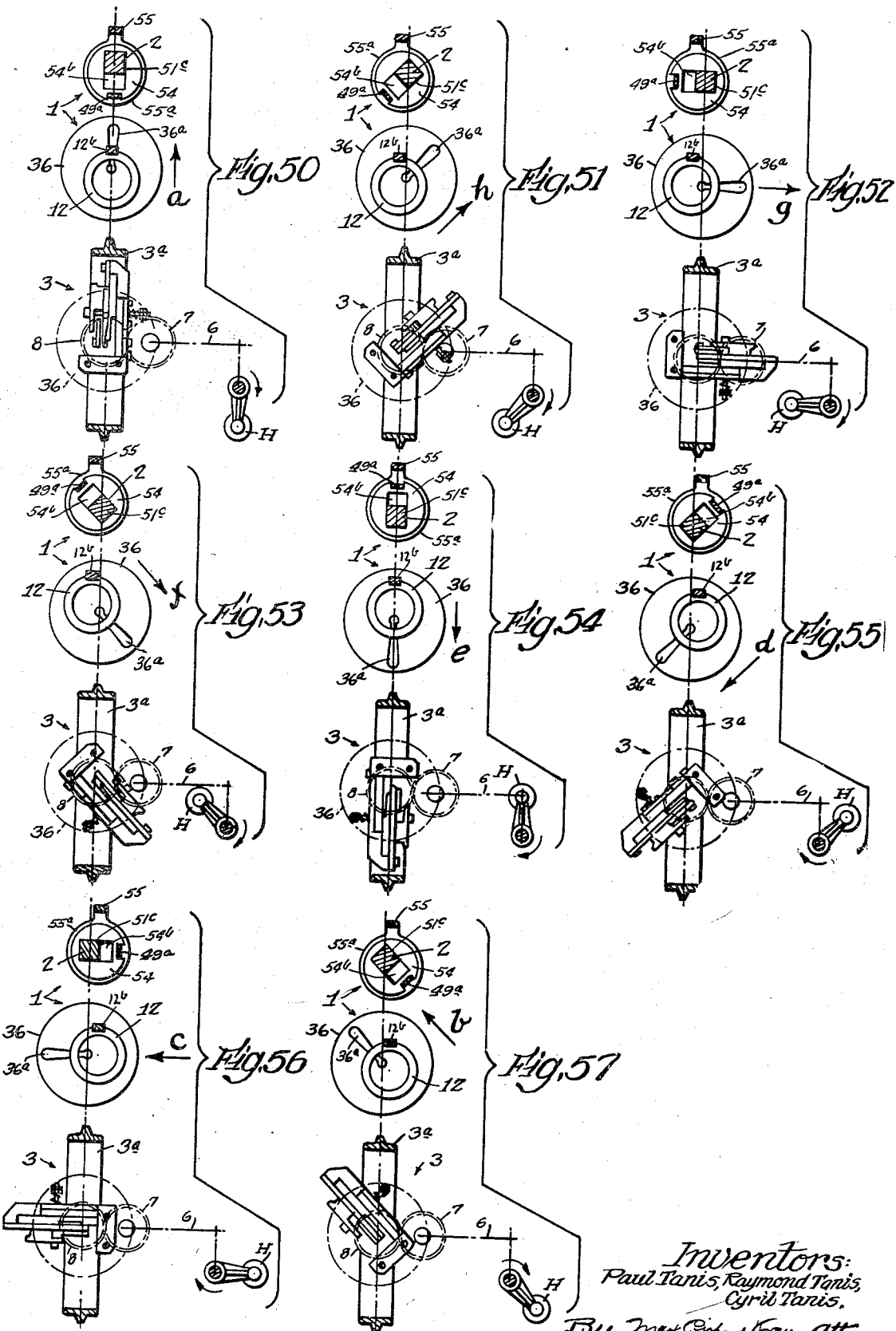

Patented Dec. 21, 1943

2,337,529

UNITED STATES PATENT OFFICE 2,337,529

UNIVERSAL TUFTING MACHINE

Paul Tanis, Raymond Tanis, and Cyril Tanis, Chicago, Ill.

Application December 4, 1941, Serial No. 421,538

11 Claims. (Cl. 112—79)

This invention relates to new and novel improvements in universal tufting machines; more especially to machines for applying the tuft in the manufacture of bed spreads, housecoats, rugs and similar articles.

The principal objects of the invention are to provide a simple and efficient apparatus for this purpose, in which cloth can be easily tufted with intricate patterns and designs such as continuous loops, spirals, crenellations, and other geometrical curves and figures in a rapid and accurate manner.

Another object of the invention is to provide a universal tufting machine that will, upon the manipulation of a control handle, simultaneously tuft and feed the cloth in the proper direction to obtain any predetermined or extemporaneous design of tufting on the cloth operated on.

Another object of the invention is to provide a machine of this kind that will tuft these designs into the cloth while maintaining the cloth in a rectilineal position with respect to the axis of the machine.

More specifically and briefly stated, the invention embodies a tufting mechanism that will upon the rotation of a manually controlled handle, correspondingly rotate about an axis through its tufting needle to tuft and feed cloth in any desired direction.

In the past, tufting machines would tuft and feed the cloth in one direction only, and were only suitable for tufting straight and relatively simple designs to the cloth operated on.

The cloth had to be moved and manipulated under the tufting head of the machine to follow the predetermined design (usually stencilled on the cloth) of tufting desired. The working clearance under the tufting head arm of a tufting machine is relatively short and the upright portion of said arm is an undesirable obstruction to the manipulation, by an operator, of relatively large pieces of cloth or other cloth articles to be tufted with spiral, looped or crenellated designs, etc., because the cloth in this particular case had to be frequently moved and rotated under the tufting head to receive the desired tufted pattern. For instance, in tufting a pattern consisting of a series of continuous loops as part of a bedspread design, the entire bed spread had to be rotated one complete turn of 360° for each and every loop tufted in the design, and in addition, if the loops in the design changed their general direction, that is to say, reversed loops, the bed spread had to be reversed in direction by the operator. These frequent clockwise and contra-clockwise rotations and manipulations of the material to be tufted wasted time and effort, causing obstructed visibility and inconvenience for the operator due to the bunching of the cloth at the tufting head and tufting head upright arm, resulting in poor quality of workmanship and lowered production.

In our present invention we have overcome all these objections by providing a universal tufting machine that will tuft cloth or cloth articles with any design or pattern without requiring the rotation or direct manipulation of the cloth by the operator; instead the operator merely keeps the cloth taut and flat (with one hand) under the tufting head of the present invention and with the other hand directs and controls the pattern to be tufted by rotating in either direction, the control handle in a suitable manner; the cloth or cloth articles being tufted always maintaining their parallelism with respect to the tufting arm and work table of the machine.

In the accompanying drawings,

Fig. 1 is a front view of the machine with the tufting mechanism in a position assumed just after a loop of yarn has been cut through to form a tuft and the feeding foot has fed the cloth preparatory to forming another tuft loop; (as in the 0° position of Fig. 45) the control handle assuming a position for tufting a straight line pattern (as in the upper left hand portion of Fig. 46) away from the front of the machine and operator.

Fig. 2 is an end view of the machine looking in the direction of the arrows on line 2—2 of Fig. 1.

Fig. 3 is a sectional view taken on the line 3—3 of Fig. 1.

Fig. 3A is a sectional view taken on the line 3A—3A of Fig. 1 but having parts broken away and omitted.

Fig. 4 is a plan view of the machine as shown in Fig. 1.

Fig. 5 is a sectional view taken on the line 5—5 of Fig. 1 with the control handle and tufting turntable assuming various positions in dotted lines; to feed and tuft in corresponding directions.

Fig. 6 is an enlarged view of the upper portion of Fig. 2.

Fig. 7 is a front view looking in the direction of the arrows on line 7—7 of Fig. 6.

Fig. 8 is an enlarged view of the lower portion of Fig. 2.

Fig. 8A is an enlarged sectional view on the line 8A—8A of Fig. 8.

Fig. 9 is a sectional view taken on the line 9—9 of Fig. 8.

Fig. 10 is a sectional view taken on the line 10—10 of Fig. 7.

Fig. 11 is a sectional view taken on the line 11—11 of Fig. 6.

Fig. 12 is a sectional view taken on the line 12—12 of Fig. 7.

Fig. 13 is a sectional view taken on the line 13—13 of Fig. 7.

Fig. 14 is a sectional view taken on the line 14—14 of Fig. 6.

Fig. 15 is a sectional view taken on the line 15—15 of Fig. 6.

Fig. 16 is a sectional view taken on the line 16—16 of Fig. 6.

Fig. 17 is a sectional view taken on the line 17—17 of Fig. 6.

Fig. 18 is a sectional view taken on the line 18—18 of Fig. 6.

Fig. 19 is a sectional view taken on the line 19—19 of Fig. 6.

Fig. 20 is a sectional view taken on the line 20—20 of Fig. 6.

Fig. 21 is a sectional view taken on the line 21—21 of Fig. 6.

Fig. 22 is an enlarged view partly in section taken on the line 22—22 of Fig. 2.

Fig. 23 is a view partly in section taken on the line 23—23 of Fig. 22 but having the main drive shaft and associated parts rotated to a position as indicated at ordinate 300° of Fig. 45 and having the cloth feeding foot and associated parts positioned by the control handle (see Fig. 52) to tuft horizontally to the right as shown in the upper right hand portion of Fig. 46.

Fig. 24 is a sectional view taken on the line 24—24 of Fig. 23 but having the feeding foot and associated parts positioned by the control handle (see Fig. 56) to tuft horizontally to the left as shown in the upper right hand portion of Fig. 46.

Fig. 25 is a sectional view taken on the line 25—25 of Fig. 23.

Fig. 26 is a plan view of the yarn looping and cutting mechanism with parts broken away and in section, taken on the line 26—26 of Fig. 8.

Fig. 27 is a sectional view on the line 27—27 of Fig. 8.

Fig. 28 is a sectional view on the line 28—28 of Fig. 8.

Fig. 29 is an elevational view with parts broken away, taken on the line 29—29 of Fig. 9.

Fig. 30 is a view similar to Fig. 6 but having the main drive shaft and co-acting parts rotated to a position as indicated at ordinate 90° of Fig. 45.

Fig. 31 is a view showing the lower continuation of Fig. 30.

Fig. 32 is a section, with parts broken away, taken on the line 32—32 of Fig. 31.

Fig. 33 is a sectional view taken on the line 33—33 of Fig. 7, but with its parts positioned to correspond with Fig. 30.

Fig. 34 is a fragmentary view of the thread control with its cam rotated to a position similar to that of Fig. 30.

Fig. 35 is a view similar to Fig. 30 but having the main drive shaft and co-acting parts rotated to a position as indicated at ordinate 210° of Fig. 45.

Fig. 36 is a view showing the lower continuation of Fig. 35.

Fig. 37 is a section with parts broken away, taken on the line 37—37 of Fig. 36.

Fig. 38 is a view similar to Fig. 33 but with its parts positioned to correspond with Fig. 35.

Fig. 39 is a view similar to Fig. 34 but with its parts positioned to conform with Fig. 35.

Fig. 40 is a view similar to Fig. 35 but having the main drive shaft and co-acting parts rotated to a position as indicated at ordinate 300° of Fig. 45.

Fig. 41 is a view showing the lower continuation of Fig. 40.

Fig. 42 is a section, with parts broken away, taken on the line 42—42 of Fig. 41.

Fig. 43 is a view similar to Fig. 38, but having its parts positioned to conform with Fig. 40.

Fig. 44 is a view similar to Fig. 39, but having a position conforming with Fig. 40.

Figure 46:
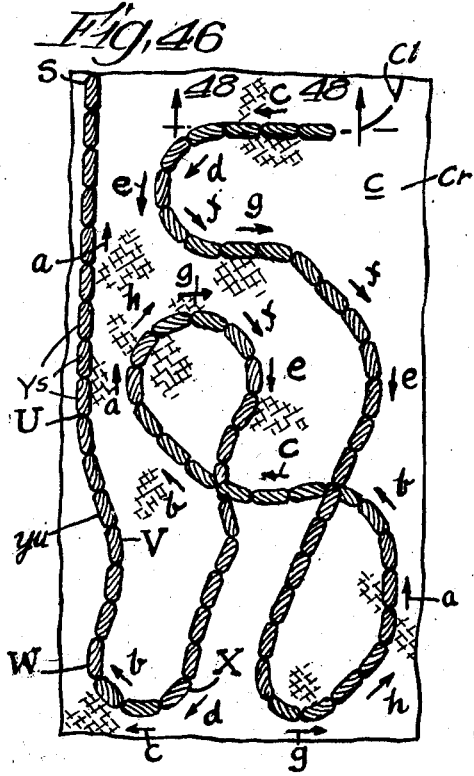
Fig. 46 is the reverse side of a portion of cloth showing variously looped designs of tufting as it would appear looking in the direction of the arrows on lines 46—46 of Figs. 1, 7 and 11.

Figs. 50 to 57 inclusive are diagrammatic planviews of the feeding foot collar, feeding foot, turntable, looping and cutting mechanism, and control handle, advanced in 45° increments by said handle to positions required to tuft corresponding positions of the cloth as shown in Fig. 46.

Referring to Figs. 1 to 5 inclusive, in general the invention comprises a tufting head mechanism 1 having a rotatable spindle 2 in vertical alignment with a simultaneously rotatable, co-acting and complementary tufting mechanism 3, the rotations thereof controllable by the manually operated handle H through mitre gears suitably arranged to simultaneously rotate shaft 4 which drives spindle 2 through mitre gears 5, 5a, and shaft 6 which, through spur gears 7 and 8 drives the tufting mechanism 3; a constant speed drive shaft 9 has secured thereto at the tufting head 1, cam 10 for vertical actuation of cloth feeding foot 12 and cloth hold down nipple 13, and cam 11 for horizontal actuation of cloth feeding foot 12; a sprocket 14, secured to shaft 9 (see Fig. 3), drives sprocket 15 fixed to shaft 16, through chain 17, causing rotation of shafts 16 to vertically actuate needle bar spindle 18 by crank 19, and thread control arm 20 by cam 21; an eccentric disc 22, secured to shaft 9 reciprocally actuates eccentric rod 23 rocking bell crank lever 24 through universal link 25 (see Fig. 3A), reciprocating tie rod 26, rocking bell crank lever 27 to oscillate in a vertical plane, looper 28, and knife 29, of tufting mechanism 3, through the medium of a vertically reciprocating shaft 30. The tufting head mechanism 1 is supported above the base 31 by an arm 32 rigidly secured thereto, said base 31 having depending from its lower face 33, a U-frame 3a within which the tufting mechanism 3 is rotatably mounted; a motor, not shown, drives belt 34, rotating pulley 35 fixed to shaft 9, actuating by means heretofore described, cloth feeding foot 12, cloth hold down nipple 13, needle bar spindle 18, thread control arm 20, looper 28, and knife 29, one turn or revolution of the pulley 35 operating these elements through one complete cycle. The handle H, when oscillated or rotated will simultaneously, and with the same angularity and direction, oscillate or rotate spindle 2, cloth hold down nipple 13, needle bar spindle 18, comprising needle bar B and needle N, and tufting mechanism 3, which includes looper 28, knife 29 and turntable 36; i. e., a one-eighth or 45° clockwise rotation of handle H (see Fig. 51) moves the aforesaid elements through a 45° rotation and in a clockwise direction; the velocity ratio of handle H, tufting mechanism 3, and spindle 2 being one to one.

The operation of the machine from the operator's point of view is briefly as follows: Lever 37 is manually lifted in the direction of arrow (see Fig. 2) raising the cloth feeding foot 12 from the base or table 31 so cloth C to be tufted can be positioned therebetween. The tufted design is usually printed, in the form of a thin line, Cl on the reverse side Cr of the cloth C (see Fig. 46), to guide the operator tufting this predetermined design. When the cloth is properly positioned under the feeding foot 12 the needle N and cloth hold down nipple 13 are directly above that point of the printed line Cl, whereupon the tufting is to be stitched; a few inches of yarn Y, are pulled down from the needle N through the nipple 13 and foot 12 and passed between the reverse side Cr of cloth C and replaceable friction ring 12a, preferably made of rubber, of the foot 12. When lever 37 is now lowered to its original position to allow foot 12 to engage the cloth C, the adjustments are completed and the machine is now ready to tuft the cloth. A foot operated rheostat is usually used to control the motor, not shown, which rotates shaft 9 through belt 34 and pulley 35 to actuate the needle N, nipple 13, looper 28, and knife 29 to tuft the cloth; and the foot 12 to horizontally feed the cloth in a straight line to the left (see Fig. 2), when the handle H is stationary, and in the position shown. This operation will produce a straight line of tufting a as indicated in Fig. 46. Any departure from this straight line of tufting is effected by movement of handle H which correspondingly causes the cloth feeding foot 12 to alter its direction of feed, and the nipple 13, needle N, looper 28 and knife 29 to simultaneously assume a relative co-angular position.

The flat rectangular base 31 (see Figs. 4 and 5), has rigidly mounted thereupon, a vertical standard 32a integral with a horizontal arm 32b terminating in a C shaped supporting bracket 32c at the tufting head 1. Attached to the open ends of bracket 32c is a vertical mechanism supporting plate 38 having a guide strip 38d, an upper bearing block 38a attached thereto, and a lower bearing block 38b in vertical alignment and outwardly turned for the rotatable support of spindle 2 and associated parts. The front face of the arm 32b and standard 32a is recessed at 32c for housing the shafts 4, 9 and 115 as shown in Figs. 1 and 3, and is provided with a cover plate 39. The end wall 40 of the standard 32a and the vertical wall 41 of the bracket 32c are provided with horizontally aligned bearings 40a and 41a respectively, for the rotary support of drive shaft 9 which projects into the space 42 between the plate 38 and the wall 41 of the bracket 32c, said shaft 9 having fixed to its projected end radial cam 10 for actuating bell-crank follower levers 43 and 44 and radial cam 11 for actuating bell-crank follower lever 45 (see Figs. 7, 10, 11, 14 and 15).

The follower levers 43, 44 and 45 are fulcrumed about shoulder screws 46 which are fastened to the plate 38 (see Fig. 10). The follower lever 45 has arm 45a which is provided with a pivoted roller 45c at the end thereof for engagement with cam 11, and arm 45b for vertical actuation of slide bar 50 by engagement with pin 50a attached to said bar 50 and projecting through a slot 50b in the plate 38 (see Figs. 10 and 25). Slide bar 50 is constrained to vertical movement against the face 38c of plate 38 by a rectangular opening 50c formed by the guide strip 38d and plate 38 at its upper end (see Fig. 13), and by guide block 47 and slide bar 60 (to be later described) at its lower end (see Figs. 13, 18, and 25).

A shifter fork 50d connected integrally with and projecting perpendicularly from the face midway of the bar 50 engages the annular groove 48b of cam 48, which is provided with a vertically disposed inclined plane 48a, to vertically actuate said cam 48 which is slidable on and rotatable with the spindle 2 (see Figs. 6, 7, 16 and 24). A lever 49, of the first order is vertically pivoted to a member 51 by a pin 51a that is press fitted into the fork 51b of said member, which is an integral enlargement of the square shaft portion 51c therebelow. The member 51 is securely mounted on the spindle 2 by a set-screw 52 and is provided with a pair of helically wound torsion springs 53 diametrically positioned on the member 51 by shoulder screws 53c. One end of the springs 53 bending as at 53a (see Fig. 11), and projecting into openings in member 51 are thus effectively prevented from rotating; the other ends terminating in relatively long legs 53b depending to and acting on annularly grooved collar 54 having suitable vertical openings 54a therethrough (see Fig. 19) for receiving the legs 53b of the springs 53 which urge said collar 54 in a direction to the right as seen in Fig. 6. The collar 54 is provided with a rectangular opening 54b, having the long sides 54c thereof engaging the square shaft portion 51c of the member 51, and a notch 54d (see Fig. 19), to form an opening 49v therethrough between said collar 54 and embracing shifter ring 55a which is pinned at 55b to the cloth feeding foot lever 55 oscillating therewith from pivot pin 56e.

The lever arm 49a of the lever 49 projects downwardly through the opening 49b between collar 54 and shifter ring 55a for oscillatory engagement therewith; the oscillation effected by the engagement of the upper arm 49c of lever 49 with inclined plane 48a of cam 48 which has projecting wings 48c extending over the sides of arm 49c of lever 49 to effect rotation therewith. That is to say, cam 48, member 51 with lever 49, collar 54 and spindle 2 rotate as a unit, while downward vertical movement of slide bar 50 causes horizontal oscillation of feed foot 12 to feed cloth C leftwardly by fork 51b coacting with cam 48 and inclined plane 48a to resultantly cause arm 49c of lever 49 to rock clockwise about pin 51a of member 51, arm 49a moving collar 54 leftwardly, causing ring 55a to oscillate the lever 55 leftwardly from fulcrum pin 56e energizing springs 53, and carrying said feed foot 12 therewith, (see Fig. 6). The release of the potential energy from springs 53 to collar 54, which oscillates the lever 55 through ring 55a to idly return foot 12 to initial cloth feeding position, is controlled by the upward movement of incline plane 48a of cam 48, permitting the lever 49 to rock contra-clockwise, collar 54 causing arm 49a to transmit its force through arm 49c against incline plane 48a of said cam 48 which is urged upwardly by torsion spring 57 acting through shifter fork 50d of bar 50, having pin 50a which urges arm 45b of follower lever 45 to contraclockwise rotation causing roller 45c to follow the receding lobe of cam 11 thereby allowing the upward movement of cam 48 (see Figs. 35 and 38).

The horizontal actuation of feed foot 12 by the rotation of cam 11 having been described, its vertical actuation by cam 10 is as follows: The follower lever 43 has arm 43a terminating in a semi-circular end 43c to serve as a roller to engage and be actuated by a radial cam 10 fixed to drive shaft 9. Arm 43b of follower lever 43 is positioned for vertical actuation of slide bar 70 by engagement with pin 70a which projects through a slot 70b in plate 38, said pin 70a integral with said bar 70 which is vertically constrained against the face 38c of plate 38 by rectangular opening 70c formed by guide strip 38d and plate 38 at its upper end and by guide block 58 at its lower end (see Figs. 13, 17 and 22).

Perpendicularly projecting from the face of bar 70 and adjacent guide strip 38d is an integral bracket 70d terminating in a bearing support for compound swivel 56 in parallel alignment with plate 38. See Figs. 6, 14 and 22. The compound swivel 56 has horizontally projecting journal 56a oscillatably mounted in bracket 70d and retained therein by collar 56b, a vertically bored sleeve 56c slidably and loosely mounted on spindle 2, and a rectangular mid-section 56d (see Fig. 14) provided with transverse pivot pin 56e to carry the yoke 55c of cloth feeding foot lever 55 which freely oscillates thereon. The lower curved end 70e of bar 70 when in the position shown in Fig. 6 is in juxtaposition with the cam portion 37a of lever 37 which is pivoted by screw 37b; the said lever 37, when lifted, will through the resultant action of cam portion 37a against the end 70e of rod 70 (which is connected to lever 55) cause the foot 12 to lift vertically from the turntable 36 for the placement of cloth therebetween. The foot 12 has a vertical leg 12b adjustably mounted on the lower end 55d of lever 55 and securely fastened thereto by clamp 58 and thumb screw 58a. A spring 59 (see Fig. 2) has a leg 59a hooked in the plate 38 so that its other leg 59b, hooked into a lug 70f laterally attached to bar 70, will react to urge it downwardly (see Figs. 6 and 16).

It will be evident that while the cams 10 and 11 actuate levers 43 and 45, slide bars 70 and 50, and then levers 55 and 49 respectively, the feed foot 12 may have any predetermined motion in a vertical plane; however, the cams 10 and 11 are designed and timed to actuate the foot 12 as shown in Figs. 6, 35 and 40, to feed the cloth leftwardly, lift away from the cloth, as shown in dotted lines in Fig. 6, move over the cloth rightwardly (see Fig. 35), and descend on the cloth (see Fig. 40). Diagram boxes V and W of Fig. 45 graphically illustrate that foot 12 dwells in a down position for 120°, lifts up while moving to the right for 90°, continues to move rightwardly while descending, for 90° and for the last 60° remains down while moving leftwardly. Torsion spring 59 with legs 59a and 59b urges the pin 70a of bar 70 against the end of arm 43b of lever 43 to keep the end 43c against the cam 10 to effect lifting of the foot 12; there being sufficient clearance between pin 70a and lever arm 43b, lever end 43c and cam 10 to allow the foot 12 to resiliently press on the cloth C and compensate for any variation in thickness of cloth or projecting loops Y1 of yarn Y. Torsion springs 53 cause foot 12 to move rightwardly on its idle return stroke; and the cam 11 through the actuation of lever 45 and bar 50 moves inclined plane 48a of cam 48 downward, causing clockwise rotation of lever 49 to move collar 54, ring 55a, lever 55, and foot 12 leftwardly. It will thus be seen that the combined action of the cams 10 and 11 utimately impart to the foot 12 an intermittent feeding action that will be co-ordinated with nipple 13, needle N, looper 28 and cutter 29. The actuation of the nipple 13 by cam 10 is as follows: The lever 44 has an arm 44a terminating in a semi-circular end 44c to act as a roller and co-act with the cam 10. The arm 44b of lever 44 is provided with a lug 44d at its extremity which projects into a slot 60b which extends through the plate 38; said lug 44d liftably engaging a pin 60a that integrally projects from bar 60, which is forced to vertical movement by guide blocks 61 fastened to the face 38c of plate 38 and bar 50 of which a lower portion vertically slides upon the face 60c of said bar 60 (see Figs. 6, 7, 16, 17 and 25). At the lower end of bar 60 is integrally attached a leftwardly projecting fork 60d (see Fig. 6), engaging rotatably, an annular groove 62a formed in the annular enlargement 62b of sleeve 62 which is slidably mounted upon the lower end of spindle 2 and feather keyed thereto as at 62c to effect rectilineal and rotary motion therewith. (See Figs. 11, 20 and 21.) The nipple 13 is secured to the lower end of sleeve 62 by set-screws 13a and tapers downwardly to a reduced cylindrical portion 13b which terminates in a hold-down surface 13c, having a relieved portion or step 13d cut therein (see Fig. 8); the portion 13b having a vertical opening 13e therethrough for the vertical actuation of needle N and yarn Y and a semicircular notch 13f to facilitate the threading of yarn Y into said needle B (see Fig. 8). The movement of nipple 13 is shown graphically in diagram box U of Fig. 45 thus: From the position shown in Fig. 6, which represents the 0° ordinate, the nipple 13 continues to rise for 30°, falls for 60°, dwells down for 210°, and rises 60°. As shown in Figs. 31 and 32, the nipple 13 holds the cloth C firmly against the turntable 36 while the needle N is piercing said cloth C and drawing yarn Y therethrough.

Figure 45:
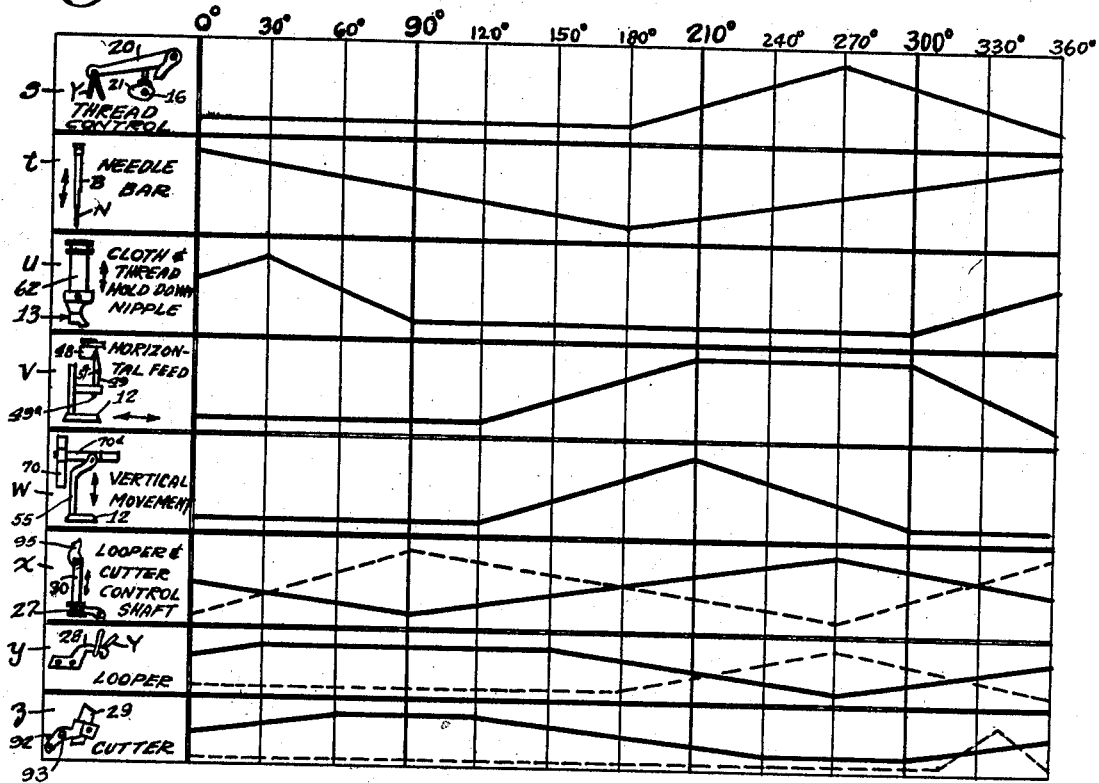
Fig. 45 is a time chart diagram showing the movements of the various elements (see Figs. 1, 2, 6 to 11 inclusive, and 30 to 44 inclusive) of the universal tufting machine for one complete revolution of the main drive shaft.

The shaft 16 as heretofore mentioned, is driven by main shaft 9 through sprockets 14 and 15 and chain 17 which is provided with an adjustable idler 17a to maintain desirable tension thereon; said idler 17a supported by a bracket 17b attached to the upper surface of horizontal arm 32b. A bearing 16a mounted upon bracket 16b attached to wall 32d of the standard 32a and a bearing 16c in bracket 63 which is mounted upon the upper portion 32e of bracket 32c support shaft 16 in rotatable alignment. The left hand end of shaft 16 is provided with a counterweighted crank 19 fixed thereon. A roller 19a journalled at and projecting from the end of crank 19 engages a slot 64a in cross-head 64 integrally attached to a rectangular stem 64b upwardly extending through and slidably guided by a bearing bracket 65 horizontally attached to and above the bracket 63; the stem 64b also extending downwardly through a bearing 66 formed between the plate 38 and upper portion 32e of bracket 32c, said bearing 66 continuing downwardly in the form of a channel 66a in plate 38, and terminating at 66b (see Figs. 11, 13 and 14). The lower portion of stem 64b is slotted as at 64c and slidably engages the end 9a of shaft 9 to assist in the vertical alignment of forked bracket 67 attached to the crosshead 63. The forked bracket 67 engages rotatably, an annular groove 18a in the enlarged diameter 18b of spindle 18 for vertical actuation therewith; said spindle 18 having, at its upper end, thumb-screw 18c to clamp, within its bore 18d, a needle bar B having cylindrical hole B1 therethrough for passage of yarn Y which emerges at the notch B2 formed in segmental portion B3 which has a groove B4 for the retention of removable needle N by set-screws B5 (see Figs. 11, 18 and 19). The spindle 2 has, at its upper end, an enlarged bore 2a terminating at 2b for the vertical reciprocation of needle bar spindle 18 which terminates at 18e, see Figs. 24 and 25, said spindle 18 having a vertical slot 18f feather keyed to shoulder screw 68 in the enlarged head 2c at the upper extremity of said spindle 2. A forked block 69 is fastened to the upper surface of guide strip 38d to engage, rotatably, the annular groove 2d in the enlarged head 2c of spindle 2 to prevent its vertical movement (see Figs. 7, 11, 13 and 24). Needle bar B is rigidly held in bore 18d of spindle 18 to its terminating point 18e, and is slidably guided for vertical actuation in bore 2e of spindle 2. It will be apparent that while needle bar spindle 18 with needle bar B and needle N reciprocate within spindle 2, which is constrained vertically, these elements will have unitary rotation effected by slot 18f and screw 68, when gear 5a drives gear 5 fixed to said spindle 2 by set-screw 5b. The time chart diagram, Fig. 45, illustrates graphically in box t the position of the needle N, needle bar B, and needle bar spindle 18 at the 0° ordinate which corresponds with Fig. 11. The needle is in an extreme upward position and harmonically moves downward by the co-action of the crank 19, rotating contra-clockwise as seen in Fig. 6, the crank roller 19a, and cross-head slot 64a, to the 180° ordinate, which is the extreme downward position for needle N, then harmonically moves upward to the 360° ordinate, or as shown in Figs. 6 and 11. Having described the mechanism for actuating needle N, the thread control, or the mechanism for properly supplying the yarn to the needle will now be described.

The cam 21, adjacent bracket 63, is fixed to the shaft 16 by pin 21a, which is a driving connection between fixed collar 21b on said shaft 16 and said cam 21 (see Figs. 10 and 12), which vertically actuates push rod 71 which is guided by bearings 65a and 65b on the vertical leg 65c of bracket 65 which terminates in a yoke 65d for pivotal support of thread control arm 20 by pin 72; said arm 20 tapering leftwardly to an eye 20a in alignment with and oscillatable above inlet bushing B6 of the needle bar B.

The arm 20 is a lever of the third order and is moved upwardly by push rod 71 at 20b, and moved downwardly by spring 73, tensioned between arm 20 at 28c, and bracket 65 at 65d; a compression spring 74 threaded on rod 71, reacts between bearing 65a and washer 71a fixed to the middle of pushrod 71 to urge it against cam 21 during the downward movement of arm 20 (see Figs. 1, 2, and 4). Yarn Y, drawn from a cop, not shown, is passed between the discs of an adjustable tensioning device T, through a pair of eyelet guides G, through the eye 20a of thread control arm 20, thence through bushing B6 of needle bar B, emerging at B2, continuing down through the bore 2e of spindle 2, through the eye N1 of needle N, emerging at the left, downwardly through opening 13e of nipple 13, through foot 12 and opening 36a of turntable 36 to the looper 28 (see Figs. 1, 8 and 11).

The action between the thread control arm 20 and the needle N is best exemplified by chart boxes S and t of Fig. 45, and Figs. 1 and 9, 37 and 39, 42 and 44. Assuming the machine was operating and is stopped at a position shown in Figs. 1 and 9 or 0° ordinate, Fig. 45: a loop of yarn Y1 remains between eye 20a of lowered arm 20 and raised bushing B6 of needle bar B (see Fig. 1) with needle N positioned to pierce cloth C with a length of yarn Y2 between eye N1 of needle N and looper 28 equivalent to yarn loop Y1 (see Figs. 8 and 9). Shaft 9 rotates for 180° and the needle N descends, while the arm 20 remains stationary; the results of this action illustrated in Figs. 37 and 39 wherein the needle N has forced the length of yarn Y2 through the cloth C forming a yarn loop Y3; the descent of needle N dropping the bushing B6 away from the stationary eye 20a, causing the yarn loop Y1 to become a taut length of yarn Y4. A further 90° rotation of shaft 9 causes arm 20 and needle N to assume the positions shown in Figs. 42 and 44 wherein both arm 20 and needle N are lifted (see ordinate 270° Fig. 45), the arm 20 having reached a maximum upward position, and the needle N raised one-half its upward stroke; this simultaneous rise of both eye 20a of arm 20 and needle N causes the yarn loop Y3 to become taut around and from the looper 28 as at Y5 to eye 20a, that is to say, the yarn Y is stretched down from the cloth C around the looper finger 28a, through the needle eye N1 and needle bar B to the eye 20a of arm 20, the needle eye N1 sliding upwardly through the stationary yarn Y, while the arm 20 in raising, measures another potential loop of yarn Y6. As the shaft 9 rotates another 90° to the position shown in Figs. 1 and 9, or the 360° ordinate in Fig. 45, the eye 20a of arm 20 descends while the needle N, including needle bar B and bushing B6 ascends (see chart boxes S and t Fig. 45) to meet again as in Fig. 1, causing the taut length of yarn Y6 in Fig. 44 to become another yarn loop Y1. It is clearly understood from the foregoing description that the yarn Y is not fed from the cop (not shown) by the descending needle; the proper length is measured by the arm 20 while the needle is ascending and the yarn is taut. Having described the mechanism of the head 1, the mechanism of the complementary and vertically aligned head 3 located beneath the base 31 will now be described:

Eccentric disc 22, fixed on drive shaft 9 within the recess 32c of standard 32a reciprocally moves rotatably mounted shaft 30 through vertically reciprocating eccentric rod 23 but in an opposed direction thereto (see Figs. 1, 3, and 3A). Chart box X of Fig. 45 graphically shows this movement, wherein ordinate 0° corresponds to the position of shaft 30 in Figs. 1, 2 and 8, said shaft 30 moving harmonically down for 90°, harmonically up for 180°, and down for 90° to repeat the motion from 0° ordinate during the rotation of shaft 9; the movement of rod 23 shown in dotted lines in chart box X of Fig. 45. Collars 9b and 9c fixed to shaft 9 prevent axial displacement of eccentric strap 23a of eccentric rod 23 which is universally connected to bell-crank lever 24 by clevis link 25 having pivot pin 75 connecting the lower end of rod 23, and the pivot pin 76 connecting the arm 24a of lever 24 fulcrumed about shoulder screw 77, which is fastened to depending support 78 rigidly held to face 33 of base 31. The adjustable arm 24b of lever 24 is provided with a series of holes 24c for the pivotal connection of clevis 79 by shoulder screw 80; the clevis 79 having an axially adjustable stem 79a threaded on the end 26a of tie rod 26 to effect any desirable change in length thereof. The other end of rod 26 is clevised as at 26b to pivotally connect with the slotted arm 27a of bellcrank 27 which is pivoted at 81 in depending bracket 82. Shoulder screw 83 is adjustably mounted in slot 27b of arm 27 to change its effective length. The other arm 27c of bell-crank 27 is forked as at 27d to reciprocate the rotatable shaft 30 which is provided with shifting collar 84 attached to its lower end; the collar 84 engaged by pins 85 extending inwardly from said fork 27d. The bracket 82 is fastened to a lug 3b integrally connected with the U-frame 3a which is provided with a central hub 3c vertically bored as at 3d for the rotatable support of depending sleeve 8a of gear 8 which is held against upward movement by collar 86 fixed to the projecting end of said sleeve 8a.

The spur gear 7 is rotatably mounted on lug 3b by a stud shaft 87 secured thereto; the gear 7 meshing with gear 8 and driving it through the intermediary of a mitre gear train and handle H to be later described (see Figs. 1, 8 and 9). The vertical supporting plate 88 has a horizontal foot 88a integral with its lower end and is rigidly fastened by screws 89 to spur gear 8 in vertical alignment with spindle 2 of tufting head 1. The turntable 36 is a circular disc provided with an elongated pear shaped opening 36a (see Fig. 5), and is horizontally mounted on angle clip 90 attached to the upper end of supporting plate 88. A concentric opening 31a in vertical alignment with gear 8 and its sleeve 8a is provided in the base 31 for the proper positioning of turntable 36.

In the upper left hand corner of the plate 88 (see Fig. 8) is a transversely disposed hole to accommodate a sleeve bearing 91 provided with a flange 91a which is fastened to the back face 88b of said plate 88 (see Figs. 26 and 27). A pivoted cutter member 92, a lever of the first order, is provided with a hub 92a pinned to a shaft 93 rockably mounted in the sleeve bearing 91 which projects partially into the enlarged bore 92b, a slotted arm 92c for holding the knife 29, and a forked arm 92d pivotally connected as at 94 with a curved link 95 and a straight link 96. The lower end 95a of link 95 is pivotally connected with the slotted upper end 30a of shaft 30 by a pin 97, and the lower end of link 96 is pivotally connected with looper arm 98, a lever of the third order, by an adjustable pivot 99 provided with eccentric disc 99a, a cylindrical projection 99b within a recess 98a, and a fastening screw 100 which clamps eccentric disc 99a against the face of arm 98 preventing undesirable movement therewith. By loosening screws 100 and screw 101 which fastens eccentric strap 102 to arm 98, the pivot 99 may be rotatively adjusted by means of screw driver slot 99c. Tightening screw 100 prevents rotary displacement of pivot 99, and tightening screw 101 prevents lateral displacement of said pivot 99, by the engagement of eccentric strap 102 with the eccentric disc 99a (see Fig. 8A).

A plate 103 (see Figs 8, 26 and 27), in the slotted arm 92c of member 92 is forced against the leg 92e by screw 104, clamping the vertically disposed knife 29 therebetween; while screw 105 threaded into leg 92f additionally clamps the knife 29 by pressing against the opposite end of plate 103. The upper angular cutting edge 29a of the flat rectangular blade comprising the knife 29 is resiliently held in shearing relation with the side 28b of looper finger 28a by compression spring 106 about the shaft 93 of the cutter arm 92c; the spring 106 reacting between the nuts 107 fastened on shaft 93, and the flange 91a of the sleeve 91 through which said shaft 93 is urged. It is obvious that cutter arm 92c is both rotatably and resiliently mounted, and that proper shearing action between knife 29 and looper 28 will be effected while cutting the yarn Y.

The looper arm 98, heretofore mentioned, is pivoted at its lower end by shoulder screw 108 in the plate 88, and constrained to parallel motion thereto by guide plate 109 and guide bar 110 which are fastened therewith by screw 111; the lower end of inclined guide bar 110 being fastened to plate 88 by screws 112. The projection 110a at the upper end of guide bar 110 provides the fastening surface for guide plate 109 providing space between the guides for the constrainment of the arm 98 (see Fig. 26). At the upper end of arm 98, looper 28 is fastened thereto by screws 113. The looper consists of a flat rectangular base 28c having, at its right hand end, a stem 28d, tapering upwardly to a rightwardly projecting horizontal finger 28a terminating in a depending hook 28e (see Fig. 8). When the needle N and looper 28 are in the position shown in Figs. 35, 36 and 37, the hook 28e on finger 28a has slid across flat portion N2 of said needle N in frictional engagement therewith to catch the loop of yarn Y3. As the flat portion N2 of needle N is in alignment with the center of rotation and axis of shaft 30 and gear 8, it follows that when unitary rotation is imparted thereto, the radially oscillated arm 98 will properly move the looper 28 across needle flat N2 regardless of any angularity of rotation they might assume.

When the shaft 30 is lifted by fork 27d, it moves lower end 95a of link 95 in a straight, vertical, and upward direction, causing the pivot 94 to swing upwardly and to the left, using shaft 93 as a pivot; and moves knife blade edge 29a downwardly and to the right. In other words, the linkage 93, 94, 97 is a toggle with fixed pivot point 93, rectilineally moving pivot 97, and resultantly moving pivot 94 which lifts link 96 upwardly, swinging arm 98 from pivot 108, causing looper 28 which is positioned directly over pivot 108, to swing in a relatively long arc in a clockwise direction (see Fig. 8). Having described the mechanism of tufting head 1, its complementary mechanism 3, and the drive thereto from shaft 9 (see Fig. 1), the tufting of the cloth in a straight line a (see Fig. 46) will now be described.

By reference to Figs. 6, 7, 8 and 9 it will be seen that bars 50 and 70 are in a lowered position resultantly causing foot 12 to contact the cloth in a position leftwardly of the needle N Bar 60 is in a partially raised position with the nipple 13 lifted from the cloth C, crank 19, with needle N being in an extreme upward position Shaft 30 ultimately actuated by eccentric 22 is in a mid-position with the looper 28 and knife 29 in a position to allow an uncut loop of yarn Y7 passing downwardly from the cloth C, looping around the finger 28a, and to pass upwardly through the needle eye N1. The uncut tuft loop Y7 (see Fig. 41), is now cut at Y8 (see Fig. 8) the cutting completed by transition of the looper 28 and knife 29 as shown in Fig. 41, to their positions as shown in Fig. 8; the foot 12 feeding the cloth C leftwardly from the position shown in Fig. 41 to move the tuft loop Y9 from a point on the cloth directly under the needle N to the position shown in Fig. 8, wherein tuft loop Y9 has now become another tuft loop Y7, effecting a stitch Ys of the predetermined pitch. The uncut tuft loop Y7 looping over the looper finger 28a prevents the yarn length Y2 from moving with the ascending needle N during its formation.

As the crank 19 rotates 90° (see Fig. 30) the needle 19 descends to the positions shown in Figs. 31 and 32. As stitch Ys is about to be formed, the cloth has not moved from its position in Fig. 8; the foot 12 remaining stationary, that is to say, bars 50 and 70 have not been lifted, the nipple 13 however, has, moving further upwardly and thence down to hold the cloth C while it is pierced with the needle N; the bar 60 moving up, and thence down as in Fig. 30 to effect this position of the nipple 13. Simultaneous with these actions the shaft 30 is lowered causing the looper 28 and knife 29 to move leftwardly; the hook 28e of looper 28 carrying tuft loop Y7 likewise leftwardly. See chart 45 at the 90° ordinate for a graphical representation for the movements of these elements, especially chart boxes y and z which show the action of the looper 28 and the knife 29.

As the crank 19 rotates through another 120° to a position indicated in Fig. 35, the needle N has moved through an extreme downward position as at the 180° ordinate of Fig. 45 and has moved upwardly for 30° as shown in Figs. 35 and 36. Meanwhile the shaft 30 moves upwardly causing the knife 29 and looper 28 to move rightwardly; the hook 28e of the looper 28 passing against the flat N2 of the needle N and into the loop Y9 of the yarn y, the nipple 13 remaining stationary on the cloth c while the foot 12 moves upwardly to the right through upward actuation of bars 70 and 50. Fig. 36 shows tuft loop Y7 in a position to be forced between the knife edge 29a and the looper finger 28a.

Fig. 40 shows the position of crank 19 when the needle N has passed upwardly through the cloth C and has drawn taut the loop Y9 about the looper finger 28e (see Fig. 41). It will be noticed that the nipple 13 is still holding down cloth C because the bar 60 is still stationary, but that bar 70 has been actuated downwardly causing foot 12 to descend vertically downward against the cloth C; the foot 12 now positioned to feed leftwardly and so move the cloth C during the transition from the position shown in Fig. 41 to the position shown in Fig. 8, or from ordinate 300° to 360° of Fig. 45. It is understood that simultaneously with the leftward movement of foot 12 the nipple 13 rises to the position shown in Fig. 8 to allow the cloth to be fed by said foot 12. The shaft 30, continuing its upward movement from its position shown in Fig. 36, continues to cause rightward movement of looper 28 and knife 29 allowing tuft loop Y7 to slide in place between the shearing surfaces of knife edge 29a and side 28b of looper finger 28a. While the needle N continues to rise to a position as shown in Fig. 8, the nipple 13 rises, the foot 12 feeds cloth to the left in position for another tuft loop to be stitched, the shaft 30 moves downward causing looper 28 and knife 29 to move leftwardly and cutting tuft loop Y7 to form tufts Y8. As the main drive shaft 9 continues to rotate, the movements of the elements graphically illustrated in Fig. 45, which is one complete cycle and shown in Figs. 6 to 11, and 30 to 44, will be continually repeated to stitch a line of tufting a passing out through the opening 36a in the turntable 36. The mechanism for and method of tufting a straight line having been described, the mechanism and method will now be described for tufting any deviation from this straight line while allowing the cloth to feed in rectilineal relation with base 31 of the machine; that is to say, without rotation of the cloth in any degree or direction.

The spur gear 7, having a mitre gear 7a integral therebelow, is in driving engagement with the spur gear 8, which rotatably supports the looping and cutting mechanism 3. A mitre gear 6a, meshing with mitre gear 7a, is fastened to the shaft 6 which is provided with a mitre gear 6b which meshes with a mitre gear 115a attached to vertical shaft 115 having a mitre gear 115b pinned to its upper end. Meshing with mitre gear 115b is a mitre gear 4a attached to shaft 4 which is provided with mitre gear 5a attached thereto at the plate 38. Bearings 4b and 4c are provided for the rotary support of shaft 4; bearings 115d and 115e rotatably supporting shaft 115, and the rotary support of shaft 6 is provided by bearings 6c and 6d. Centrally located on shaft 115 is a mitre gear 115c pinned thereon to mesh with a mitre gear 116a attached to the shaft 116 the other end of which is provided with the mitre gear 116b securely attached thereto. Fixed to the end of shaft 117 is a mitre gear 117a in mesh with mitre gear 116b; the opposite end of shaft 117 having a mitre 117b fixed thereto for engagement with a mitre gear 118a fixed to the shaft 118 which is provided with an arm 119 fixed to the opposite end thereof and provided with a rotatable handle H. The bracket 120 rotatably supports the shafts 117 and 118, and the bracket 121 serves as a bearing for shaft 116.

When the handle H is rotated, it will drive shaft 115 through the pairs of mitres 118a—117b, 117a—116b, and 116a—115c which simultaneously drives shafts 4 and 6 through the pairs of mitres 115b—4a, and 115a—6b respectively. The spindle 2 provided with mitre gear 5 to mesh with mitre 5a of shaft 4, and the looping and cutting mechanism 3 provided with spur gear 8 to mesh with gear 7, which is integral with mitre 7a and meshing with mitre gear 6a, are likewise simultaneously rotated. More specifically, when the spindle 2, having mitre gear 5 securely set-screwed thereon is rotated by mitre gear 5a, needle bar spindle 18, needle bar B, needle N, cam 48, member 51 with lever 49, collar 54, and nipple 13 have unitary rotation with the plate 88 securely mounted upon spur gear 8 which is rotated by spur gear 7, said plate 88 carrying member 92 with knife 29, curved link 95 connected with shaft 30 carrying collar 84, looper 28 with arm 98, link 96, and turntable 36; all these elements so arranged and constructed to operate at any angle and rotation, or any continuous or intermittent rotation in either direction.

Fig. 5 shows the turntable 36 with opening 36a in full lines, in the base 31 of the machine, and handle H in full lines corresponding with the position in Figs. 1 to 22, and 26, and Fig. 50. Various positions of handle H are indicated in dotted lines with the reference numerals i', j', k', l', m' and n' corresponding to positions of turntable openings 36a marked i, j, k, l, m and n respectively. As the turntable 36 rotates, or moves, so moves the elements above and below base 31, clearly described in the above paragraph. As the tufting Tu at fabrication, must be fed through and out of opening 36a in turntable 36 regardless of the position it assumes while stationary or rotating, the feeding and fabrication of tufting may be in any horizontal direction manually controlled by handle H and at the will of the operator.

As heretofore described, it was clearly shown how the mechanism and the operation thereof would function at any angle of rotation, with the exception of the cloth feeding foot 12 which does not rotate with the other elements. Referring again to Fig. 5, when the opening 36a (in full lines) is directed upwardly or extending to the left as in Fig. 8, the feed foot 12 must feed upwardly as in Figs. 1 and 50, or leftwardly as in Fig. 8. For example, if the handle H is in a position as indicated by reference numeral m' the opening 36a will be at m, if handle H is at n', opening 36a will be at n, and if the handle H moves from i' to l' in a clockwise direction, opening 36a will move from i to l in a clockwise direction, as indicated by the arrows in full lines p, and in dotted lines o. It follows that the feed foot 12 must feed cloth C in the direction extended by opening 36a, that is to say, diametrically of the turntable 36, in alignment with, and in a direction toward the enlarged end of the opening 36a, as shown by arrows q (Fig. 5).

As the feeding foot 12 does not rotate with the rotating elements in the present form of the invention; although with suitable modifications it could be so arranged, a unique method is provided for its proper actuation in any relative rotation of the said elements. As previously described, the foot 12 is supported by arm 55 which is universally pivoted on the compound swivel 56 (see Figs. 6 and 14). Therefore, the foot 12 is oscillatable in any vertical direction by the ring member 55a attached thereto, coacting with rotatable and horizontally oscillatable collar 54 actuated by the lever 49 with its cam 48 (see Fig. 19). Since the collar 54 rotates with square shaft portion 51c of member 51, with lever 49 and cam 48, which rotates with spindle 2, it is apparent that these elements may assume any rotative position or rotate in either direction while actuating the foot 12, which is oscillated to feed the cloth C in a direction diametrically opposed to any position the lever 49 may assume. For example, in Fig. 6 the lever 49 through handle H, has been rotated to the position shown in Fig. 6 wherein the lever 49 is positioned to the right of the axis of spindle 2, causing the foot 12 to feed leftwardly, as shown diagrammatically in Fig. 50, the direction of the arrow indicating the direction the cloth is fed to be tufted. Fig. 24 shows the lever 49 rotated to a position to the left of the axis of spindle 2 but adjacent the plate 38, in other words the lever 49, through handle H, has been rotated 90° contraclockwise as seen from above, from the position shown in Fig. 6, oscillating the foot 12 to feed cloth C to the right, or as shown by the direction of the arrow in Fig. 56. To feed and tuft cloth in the direction of the arrow as shown in Fig. 52, the lever 49 must be rotated by handle H to the position shown in Fig. 25, wherein the lever 49 is positioned to the left of the spindle axis therefor, tufting and feeding cloth to the right, the lever 49 rotated, as seen from above, 90° clockwise from the position shown in Fig. 6, or 180° from the position shown in Fig. 24.

Fig. 46 shows the reverse side Cr of the cloth C as seen from above during the tufting operations in the machine. The design illustrated shows a sample of the many and varied geometrical designs, patterns, figures, etc., it is possible to produce in the tufting of chenille or similar work for various uses. The arrows designated "a" to "h" inclusive, are also shown in the Figs. 50 to 57 inclusive (which are diagrammatic and show the square shaft 51c sectionally shaded as a solid area) and show the position of the handle H to produce tufted designs in various directions; it being understood that handle H, in producing the tufted design shown in Fig. 46 must be moving continually except when producing tufted designs or portions of tufted designs that do not deviate from a straight line such as "a" in the left hand portion of Fig. 46.

If the tufting is started on cloth C at S, Fig. 46, the handle H is positioned as in Fig. 50 and is left stationary until the cloth is tufted to the point U, then handle H is gradually moved about 5° to the right to point V, straightened again as at Fig. 50, gradually moved toward the left about 5°, straightened as is Fig. 50, at point W, uniformly rotated to the right to point X in the handle H assuming, progressively, the positions from Figs. 50, 57, 56, 55, for point W see Fig. 50, for point b see Fig. 57, for point c see Fig. 56, for point d see Fig. 55. Any other positions of handle H for other points on the tufting design are as follows: point e, see Fig. 54, point f, see Fig. 53, point g, see Fig. 52, point h, see Fig. 51; any other positions of handle H for tufting in various directions are modifications in its position; for example, if a line of tufting inclined 22½° to the left and in an upward direction were required, the handle H would be positioned midway between the positions shown in Figs. 50 and 57, and if the tufting were required to incline 22½° to the right in a downward direction handle H would be positioned midway between that shown in Figs. 53 and 54. In other words the direction the cloth will be tufted is indicated by the position of the handle H, always feeding and tufting in a direction away from the handle H except in Fig. 53 wherein the feeding and tufting are toward the handle H. The rate of speed the handle H is rotated or moved in producing curvilineal tufted designs is proportionate to the speed of the machine, that is, if the speed of drive shaft 9 were increased, the speed of handle H in following a predetermined design would be increased, or vice versa and for all curvilinear designs of tufting which incline to the left, the handle H is moved to the left, and vice versa. If a tufted design of a regular spiral of contra-clockwise lead is to be started at the end of the outside coil, handle H would be turned contra-clockwise in a gradually increasing rate of speed until the pole of the spiral was reached, but if the same spiral were to start from the pole, the handle would be rotated clockwise at an ever diminishing rate of speed until the end of the spiral design to be tufted was reached. It is evident that since the tufting heads 1 and 3 feed and tuft the cloth in any direction desired, the cloth itself is merely guided by the operator to produce the necessary design. The edges of the cloth, if it were rectangular in shape would always be parallel to the rectangular base 31 of the machine, assuming the cloth was originally placed in that position by said operator.

Any embroidery operator or others skilled in the making of chenille or similar products can easily and quickly learn to operate this machine to execute intricate tufting designs otherwise practically impossible to produce with the machines of the past. As the cloth is not moved in the directions the various patterns follow, there is no tendency for it to bunch up about the head 1 or standard 32a of the machine preventing the operator from seeing the stenciled design to be followed, or preventing the operator from manipulating the cloth to follow the patterns to be tufted.

Figure 47:
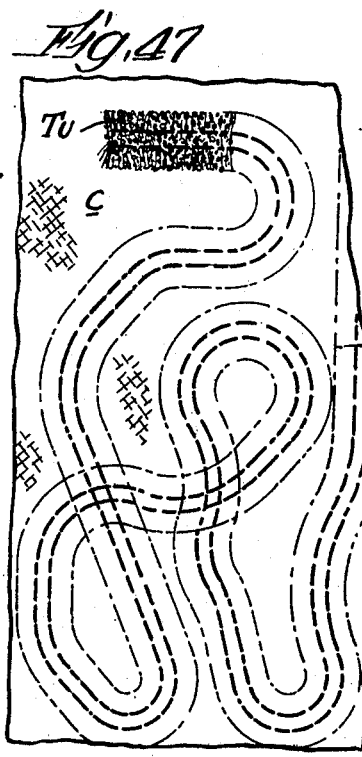
Fig. 47 is a view of the obverse side of the tufted cloth as shown in Fig. 46.

In tufting designs of long radii the handle H is uniformly moved at a slow rate of speed, and in tufting short and small radii the handle H is moved relatively faster. Fig. 47 shows the obverse or face side of the tufted cloth C of Fig. 46 and shows the tufting crossing over itself in making a certain design that would require three complete revolutions of the cloth if it were tufted in the machines of the past.

Figure 48:
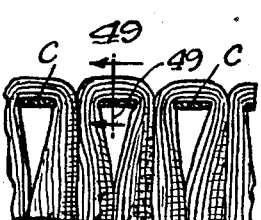
Fig. 48 is an enlarged sectional view taken on the line 48—48 of Fig. 46.
Figure 49:
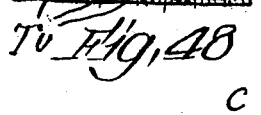
Fig. 49 is a sectional view taken on the line 49—49 of Fig. 48.

Figs. 48 and 49 show the tufting in the cloth C which is shrunk in the usual manner to prevent the dislocation of the tufts.

From the foregoing description it is obvious that a universal tufting machine constructed in accordance with this invention will be efficient and compact, easy to construct and operate, will produce more work of a simple nature, and effect the fast production of intricate designs now practially impossible to produce with the standard machines now available.

It will be understood that we have illustrated and described but one embodiment of our invention by way of example only, to disclose the principle thereof. We do not, however, intend thereby to limit ourselves to the specific embodiment but desire and intend to cover said principle of our invention broadly in whatever mechanism it might find embodiment, such as in sewing, stitching, knitting, crocheting, netting, or weaving machines.

We claim:

1. In a tufting machine, in combination a cloth feeding foot, a nipple for temporarily holding down the cloth, a needle, means delivering yarn to said needle, a looper, a knife adjacent to and cooperating with said looper, a constant speed drive for actuating said cloth feeding foot, nipple, needle, looper, and knife, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated.

2. In a tufting machine, in combination, a cloth feeding foot, a lever for imparting feed motion to said feeding foot, a nipple for temporarily holding down the cloth, a needle, means delivering yarn to said needle, a looper, a knife adjacent to and cooperating with said looper, a constant speed drive for actuating said cloth feeding foot, nipple, needle, looper, and knife, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, means coupling said feeding foot, nipple, needle, looper, and knife for unitary rotation with said turntable upon the latter being actuated, the radial extension of said opening in the turntable being in the same radial plane as said feed motion imparting lever is moving.

3. In a tufting machine, in combination, a cloth feeding foot, a nipple for temporarily holding down the cloth, a vertically reciprocable needle, means delivering yarn to said needle, a measuring device adapted to measure a predetermined length of yarn while the needle is ascending, a looper, a knife adjacent to and cooperating with said looper, a constant speed drive for actuating said cloth feeding foot, nipple, needle, measuring device, looper, and knife, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated.

4. In a tufting machine, in combination, a cloth feeding foot, a nipple for temporarily holding down the cloth, a needle, a shaft for imparting reciprocating movement to said needle, means delivering yarn to said needle, comprising a yarn guiding lever, a looper, a knife adjacent to and cooperating with said looper, a constant speed drive for actuating said cloth feeding foot, nipple, needle, shaft, looper, and knife, means interposed between said lever and said shaft adapted to move said lever towards said needle while same is ascending, thereby forming a loop of yarn for supply to said needle, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated.

5. In a tufting machine in combination a cloth feeding foot, a nipple for temporarily holding down the cloth, a needle, a shaft for imparting reciprocating movement to said needle, means delivering yarn to said needle comprising a yarn guiding lever having an eye for the passage of the yarn, a fulcrum for said lever, a cam secured to said shaft, a rod adapted to be positively actuated by said cam and bearing against said lever at a point between said fulcrum and said eye, a looper, a knife adjacent to and cooperating with said looper, a constant speed drive for actuating said cloth feeding foot, nipple, needle, cam, looper, and knife, a spring connected with said lever for moving the eye of said lever towards the needle, said cam being of such configuration as to permit said spring to move said eye of said lever towards the needle while same is ascending, thereby forming a loop of yarn for supply to said needle, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated.

6. In a tufting machine in combination a cloth feeding foot, a nipple for temporarily holding down the cloth, a vertically reciprocable needle, means delivering yarn to said needle, a measuring device adapted to measure a predetermined length of yarn while the needle is ascending, a looper, a knife adjacent to and cooperating with said looper, a constant speed drive for actuating said cloth feeding foot, nipple, needle, measuring device, looper, and knife, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated, the radial extension of said opening in the turntable being in the same radial plane as said feed motion imparting lever is arranged to move.

7. In a tufting machine in combination a cloth feeding foot, a nipple for temporarily holding down the cloth, a needle, a shaft for imparting reciprocating movement to said needle, means delivering yarn to said needle comprising a yarn guiding lever, a looper, a knife adjacent to and cooperating with said looper, a constant speed drive for actuating said cloth feeding foot, nipple, needle, shaft, looper, and knife, means interposed between said lever and said shaft adapted to move said lever towards said needle while same is ascending, forming thereby a loop of yarn for supply to said needle, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated, the radial extension of said opening in the turntable being in the same radial plane as said feed motion imparting lever is arranged to move.

8. In a tufting machine in combination a cloth feeding foot, a nipple for temporarily holding down the cloth, a needle, a shaft for imparting reciprocating movement to said needle, means delivering yarn to said needle comprising a yarn guiding lever having an eye for the passage of the yarn, a fulcrum for said lever, a cam secured to said shaft, a rod adapted to be positively actuated by said cam and bearing against said lever at a point between said fulcrum and said eye, a looper, a knife adjacent to and cooperating with said looper, a constant speed drive for actuating said cloth feeding foot, nipple, needle, cam, looper, and knife, a spring connected with said lever for moving the eye of said lever towards the needle, said cam being of such configuration as to permit said spring to move said eye of said lever towards the needle while same is ascending, thereby forming a loop of yarn for supply to said needle, a rotatable turntable disposed between said feeding foot and nipple on the one hand and said looper and knife on the other hand and having an elongated opening extending radially from the center for the passage of the needle as well as of tufts produced, said turntable being rotatable independently of said constant speed drive, and means coupling said feeding foot, nipple, needle, looper, and knife for unitary rotation with said turntable upon the latter being actuated, the radial extension of said opening in the turntable being in the same radial plane as said feed motion imparting lever is arranged to move.

9. In a tufting machine, in combination a cloth feeding foot, a nipple for temporarily holding down the cloth, a needle, a shaft for imparting reciprocating movement to said needle, means delivering yarn to said needle comprising a yarn guiding lever, a looper, a knife adjacent to and cooperating with said looper, a constant speed drive for actuating said cloth feeding foot, nipple, needle, shaft, looper, and knife, means interposed between said lever and said shaft adapted to move said lever toward said needle while same is ascending, thereby forming a loop of yarn for supply to said needle, and a rotatable turntable disposed between said feeding foot and nipple on the one hand and said looper and knife on the other, said turntable being rotatable independently of said constant speed drive.

10. In a tufting machine, in combination a cloth feeding foot, a nipple for temporarily holding down the cloth, a needle, a shaft for imparting reciprocating movement to said needle, means delivering yarn to said needle comprising a yarn guiding lever, a looper, a knife adjacent to and cooperating with said looper, a constant speed drive for actuating said cloth feeding foot, nipple, needle, shaft, looper, and knife, means interposed between said lever and said shaft adapted to move said lever toward said needle while same is ascending thereby forming a loop of yarn for supply to said needle, means positively actuated by said shaft for keeping said lever stationary while said needle is descending, and a rotatable turntable disposed between said feeding foot and nipple on the one hand and said looper and knife on the other, said turntable being rotatable independently of said constant speed drive.

11. In a tufting machine in combination a cloth feeding foot, a nipple for temporarily holding down the cloth, a needle, a shaft for imparting reciprocating movement to said needle, means delivering yarn to said needle comprising a yarn guiding lever having an eye for the passage of the yarn, a fulcrum for said lever, a cam secured to said shaft, a rod adapted to be positively actuated by said cam and bearing against said lever at a point between said fulcrum and said eye, a looper, a knife adjacent to and cooperating with said looper, a constant speed drive for actuating said cloth feeding foot, nipple, needle, cam, looper, and knife, a spring connected with said lever for moving the eye of said lever towards the needle, said cam being of such configuration as to permit said spring to move said eye of said lever towards the needle while same is ascending, thereby forming a loop of yarn for supply to said needle, and a rotatable turntable disposed between said feeding foot and nipple on the one hand and said looper and knife on the other hand, said turntable being rotatable independently of said constant speed drive.

RAYMOND TANIS.
PAUL TANIS.
CYRIL TANIS.